(12) United States Patent
Kitamura et al.

(10) Patent No.: US 8,953,248 B2
(45) Date of Patent: Feb. 10, 2015

(54) GAMING MACHINE

(71) Applicants: Universal Entertainment Corporation, Tokyo (JP); Aruze Gaming America, Inc., Las Vegas, NV (US)

(72) Inventors: Kenta Kitamura, Tokyo (JP); Jun Hirato, Tokyo (JP); Takashi Izawa, Tokyo (JP); Keita Shimura, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 0 days.

(21) Appl. No.: 13/935,626

(22) Filed: Jul. 5, 2013

(65) Prior Publication Data

US 2015/0009575 A1 Jan. 8, 2015

(51) Int. Cl.
*G02B 27/14* (2006.01)
*G02B 27/12* (2006.01)

(52) U.S. Cl.
USPC .............................. 359/633; 359/639; 359/630

(58) Field of Classification Search
USPC .................................................. 359/630–639
See application file for complete search history.

(56) References Cited

U.S. PATENT DOCUMENTS

| | | | |
|---|---|---|---|
| 2003/0166417 A1* | 9/2003 | Moriyama et al. | 463/46 |
| 2008/0096651 A1* | 4/2008 | Okada | 463/31 |
| 2011/0092266 A1 | 4/2011 | Kitamura | |

* cited by examiner

*Primary Examiner* — Mohammed Hasan
(74) *Attorney, Agent, or Firm* — Lexyoume IP Meister, PLLC

(57) ABSTRACT

A gaming machine according to an embodiment of the present invention includes: a first display panel configured to display game images of a game, the first display panel including a screen facing downward; a plurality of first beam splitters disposed under the first display panel and inclined with respect to the screen to partially reflect the images from the first the display panel into a forward direction; a background image generator disposed rear to the first beam splitters and generating background images, the background images from the background image generator passing through the first beam splitters toward the forward direction to overlap the game images; and a controller configured to execute the game and to control the first display panel.

17 Claims, 54 Drawing Sheets

GAMING MACHINE

BACKGROUND (a) Field

The present invention generally relates to a gaming machine.

(b) Description of the Related Art

Some of table games are hosted by a dealer or hosted by a computer in place of the dealer. A computer-hosting game may be played by a single player or a plurality of players connected via a network. Widely known multiplayer games may include craps, sic bo, roulette, for example. A craps game is disclosed in U.S. Patent Application Publication No. 2011/0092266, for example.

The craps or sic bo games may use physical dice or virtual dice that may be seen from a plurality of players. When using virtual dice, an image display may be used in displaying the virtual dice. However, the virtual dice displayed by the image display may not attract more than the physical dice.

SUMMARY

A gaming machine according to an embodiment of the present invention includes: a first display panel configured to display game images of a game, the first display panel including a screen facing downward; a plurality of first beam splitters disposed under the first display panel and inclined with respect to the screen to partially reflect the images from the first the display panel into a forward direction; a background image generator disposed rear to the first beam splitters and generating background images, the background images from the background image generator passing through the first beam splitters toward the forward direction to overlap the game images; and a controller configured to execute the game and to control the first display panel.

The background image generator may include: a second display panel disposed under the first beam splitters and generating the background images; and a plurality of second beam splitters disposed rear to the first beam splitters and inclined reverse to the first beam splitters to partially reflect the background images from the second the display panel into the forward direction.

The first beam splitters may form a regular pyramid, and the second beam splitters form a reversed pyramid disposed in the regular pyramid.

The background image generator may include: a projector disposed under the first beam splitters and generating the background images; and an image transmission member disposed rear to the first beam splitters, the image transmission member transmitting the background images from the projector into the forward direction.

The image transmission member may include a plurality of transparent plates inclined substantially parallel to the first beam splitters.

The image transmission member may include a plurality of second beam splitters inclined substantially parallel to the first beam splitters and partially transmitting the background images.

The background image generator may further include a screen member disposed on an outer surface of the image transmission member.

The screen member may include a colored transparent or translucent sheet.

The first beam splitters may form a first pyramid, and the image transmission member may form a second pyramid disposed in the first pyramid.

The background image generator may include: a screen member disposed on a rear surface of the first beam splitters; and a projector disposed under the first beam splitters and generating the background images, the background images illuminated to the screen member.

The screen member may include a colored transparent or translucent sheet.

The first beam splitters may form a pyramid.

The gaming machine may further include a blocking member disposed in front of the display panel and extending downward from the display panel.

The gaming machine may further include a filter disposed on the screen of the display panel, wherein the filter may include a translucent area facing a peripheral area of the screen and partially transmitting light from the display device with a transmittance that increases from an outer edge of the translucent area to an inner edge of the translucent area.

The gaming machine may further include a plurality of player terminals connected to the controller.

The plurality of player terminals are arranged such that at least two of the plurality of player terminals correspond to one of the first beam splitters.

The game may include one of craps, sic bo, and roulette.

DETAILED DESCRIPTION

Figure 1A:
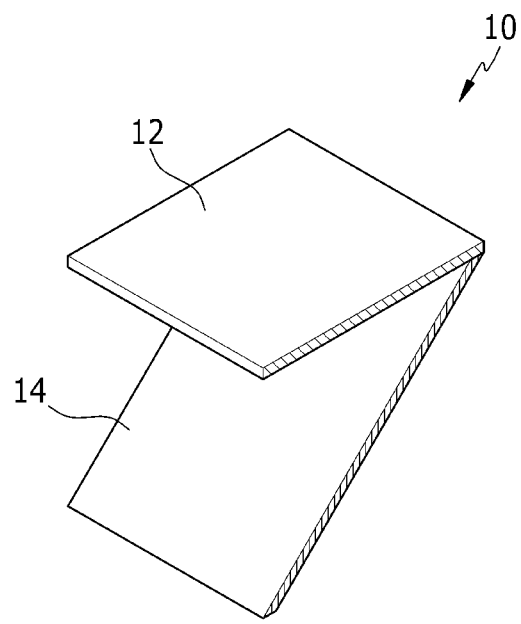
FIG. 1A is a schematic perspective view of a display device for a gaming machine according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A display device for a gaming machine according to an embodiment of the present invention is described with reference to FIG. 1A, FIG. 1B, and FIG. 1C.

Figure 1B:
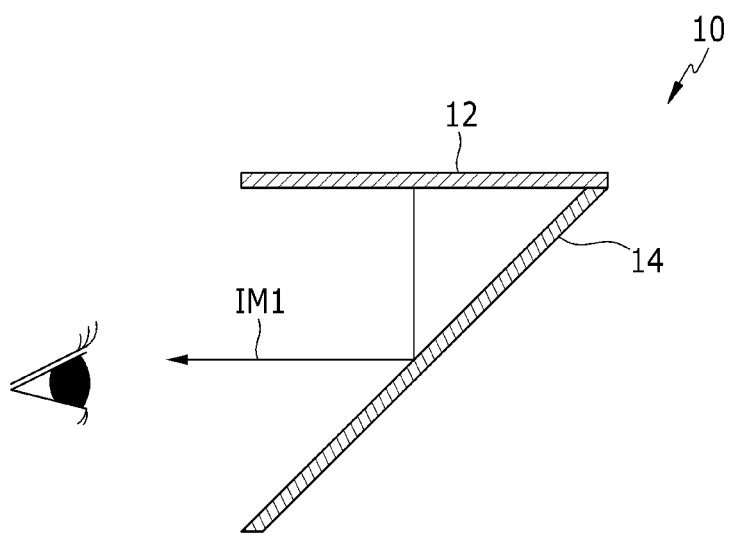
FIG. 1B is a schematic lateral view of the display device shown in FIG. 1A.
Figure 1C:
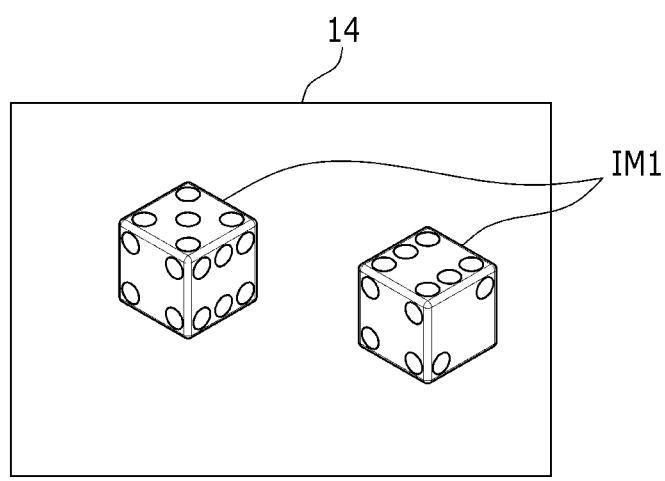
FIG. 1C illustrates an exemplary image on a minor of the display device shown in FIG. 1A.

FIG. 1A is a schematic perspective view of a display device for a gaming machine according to an embodiment of the present invention, FIG. 1B is a schematic lateral view of the display device shown in FIG. 1A, and FIG. 1C illustrates an exemplary image on a mirror of the display device shown in FIG. 1A.

Referring to FIG. 1A, a display device 10 for a gaming machine according to an embodiment of the present invention includes a display panel 12 and a minor 14. The display device 20 may be used in a multiplayer gaming machine including a plurality of player terminals or stations. However, the display device 10 may be also used in a single-player gaming machine.

The display panel 12 may include a screen facing downward, and the screen of the display panel 12 may be disposed on a horizontal plane. The images may be related to a game that may be a multiplayer game, for example, craps, sic bo, or roulette. However, the game may be a single-player game. The display panel 12 may include a flat panel display, for example, a liquid crystal display or an organic light emitting display.

The mirror 14 is disposed inclined to the screen of the display panel 12. In detail, the mirror 14 has a front surface, which obliquely faces the screen surface of the display device 12, and a rear surface that is disposed opposite the front surface. An angle made by the mirror 14 and the screen surface of the display panel 12 may range from about 40 degrees to about 50 degrees, for example, about 45 degrees. The mirror 14 may partly or entirely overlap the screen of the display panel 12 when viewed from the top.

Referring to FIG. 1B, the mirror 14 is reflective or at least partially reflective such that the mirror 14 may reflect an image IM1 from the display panel 12. Therefore, referring to FIG. 1C, a player in front of the mirror 14 may see the image IM1 from the display panel 12. The player may feel as if the image IM1 is floating in the air, particularly when the mirror 14 is partially reflective, and the player may be surprised and amused by the image IM1.

The display panel 12, which is disposed at an upper portion of the display device 10, may not easily get caught since people may be more likely to look down than to look up in a gaming place such as a casino. On the contrary, when the display panel 12 is disposed at a lower portion of the display device 10 such that the screen of the display panel 12 face upward, and the mirror 14 is disposed such that a front surface of the mirror 14 obliquely faces the screen of the display panel 12, the player may easily come across the display panel 12.

A display device for a gaming machine according to another embodiment of the present invention is described with reference to FIG. 2A, FIG. 2B, and FIG. 2C.

Figure 2A:
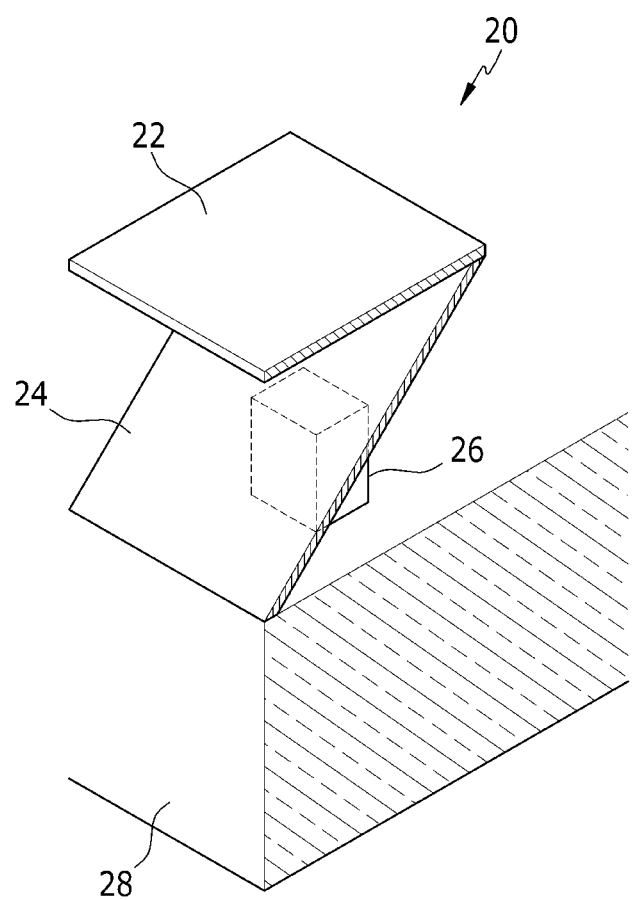
FIG. 2A is a schematic perspective view of a display device for a gaming machine according to an embodiment of the present invention.
Figure 2B:
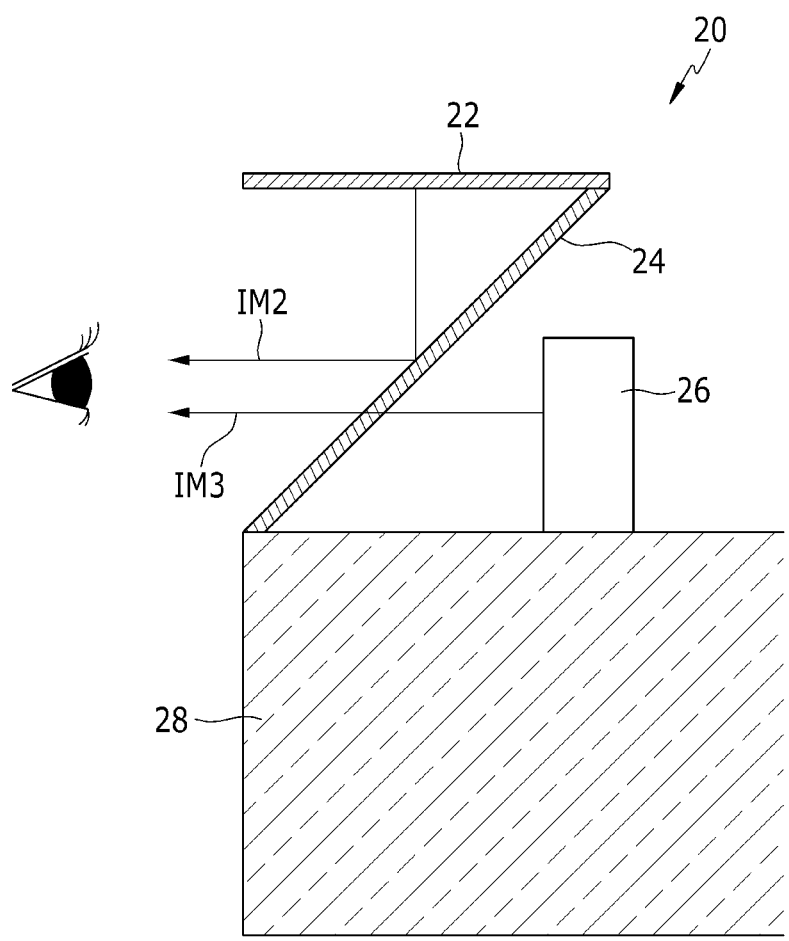
FIG. 2B is a schematic lateral view of the display device shown in FIG. 2A.
Figure 2C:
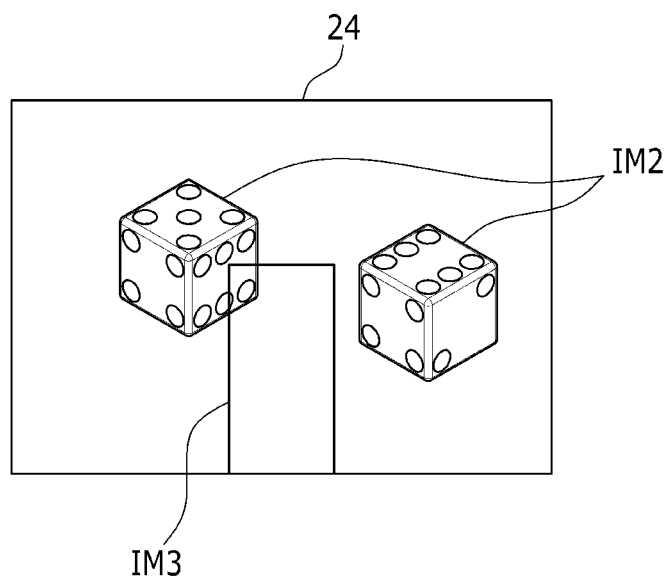
FIG. 2C illustrates an exemplary image on a beam splitter of the display device shown in FIG. 2A.

FIG. 2A is a schematic perspective view of a display device for a gaming machine according to an embodiment of the present invention, FIG. 2B is a schematic lateral view of the display device shown in FIG. 2A, and FIG. 2C illustrates an exemplary image on a beam splitter of the display device shown in FIG. 2A.

Referring to FIG. 2A, a display device 20 for a gaming machine according to another embodiment of the present invention includes a display panel 22, a beam splitter 24, and a background member 26. The display panel 22 faces down to display images downward. The beam splitter 24 has a shape of a plate, and is disposed inclined to the display panel 22. The background member 26 is disposed behind the partial minor 24.

Referring to FIG. 2B, the beam splitter 24 may partially reflect and partially transmit incident light such that the beam splitter 24 partially reflect an image IM2 from the display panel 22 and partially transmit an image IM3 of the background member 26. For example, the beam splitter 24 may include a half minor or a half-silvered mirror that transmits half of incident light and reflects the remainder of the incident light, which is also referred to as a "magic mirror." However, the beam splitter 24 is not limited to the half transmission and the half reflection. The beam splitter 24 may be also referred to as a partial mirror. Therefore, referring to FIG. 2C, a player in front of the beam splitter 24 may see a combination of the image IM2 from the display panel 22 and the image IM3 of the background member 26. The player may feel as if the image IM2 is floating in front of the image IM3, and the player may be further surprised and amused by the combined image. FIG. 2C shows that a pair of dice images as an example of the image IM2 are floating in front of a building as an example of the image IM3.

The background member 26 is disposed at the rear of the beam splitter 24 such that the background member 26 obliquely faces the rear surface of the beam splitter 24. The background member 26 may include a miniature landscape, for example, a miniature nightscape of Las Vegas. The background member 26 may further include a lighting that may illuminate the miniature or may be included in the miniature so that the player can see the miniature. However, the brightness of the lighting may not be too high for the player to see the image IM2 from the display device 22. The lighting may include a light emitting diode (LED), for example.

The display device 20 may further include a support 28 that supports the beam splitter 24 and the background member 26.

Other structures of the display device 20 may be substantially the same as the display device 10 described above with reference to FIG. 1A to FIG. 1C.

Like the display device 10 shown in FIG. 1A to FIG. 1C, the display panel 22, which is disposed at an upper portion of the display device 20, may not easily get caught compared with an example where the display panel 22 is disposed at a lower portion of the display device 20 such that the screen of the display panel 22 face upward, and the mirror 24 is disposed such that a front surface of the mirror 24 obliquely faces the screen of the display panel 22.

In addition, the display device 20 including the top display panel 22 may have a smaller size than a comparative example where the display panel 22 is disposed at a lower portion of the display device 20 such that the screen of the display panel 22 face upward, and the mirror 24 is disposed such that a front surface of the mirror 24 obliquely faces the screen of the display panel 22. In the comparative example, the beam splitter 24 may lean toward a player with a lower edge of the beam splitter 24 being disposed in front of the background member 26, and the display panel 22 may be disposed in front of the background member 26. Therefore, in a top view, a total area may be equal to or greater than a sum of an area occupied by the display panel 22 and an area occupied by the background member 26. In this embodiment, the beam splitter 24 leans toward the background member 26 to overlap the background member 26, and thus the area occupied by the display panel 22 may overlap the area occupied by the background member 26 as shown in FIG. 2B. Therefore, in a top view, a total area may be smaller than a sum of an area occupied by the display panel 22 and an area occupied by the background member 26. Accordingly, the size of the display device 20 according to this embodiment may be reduced.

A display device for a gaming machine according to another embodiment of the present invention is described with reference to FIG. 3.

Figure 3:
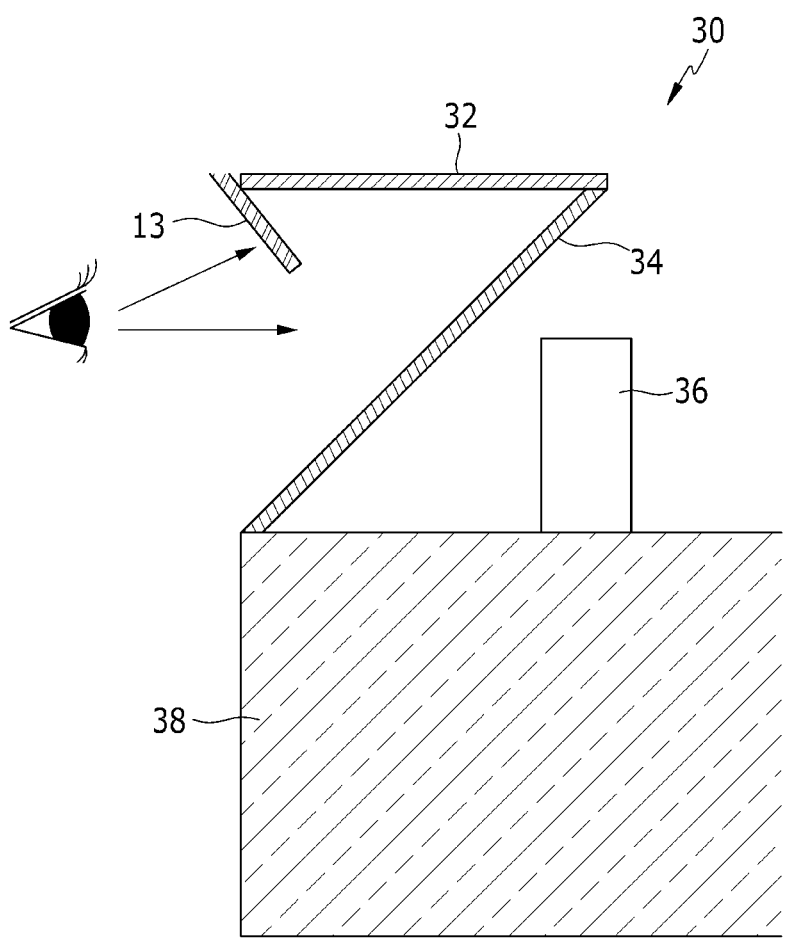
FIG. 3 is a schematic perspective view of a display device for a gaming machine according to an embodiment of the present invention.

FIG. 3 is a schematic perspective view of a display device for a gaming machine according to an embodiment of the present invention.

Referring to FIG. 3, a display device 30 for a gaming machine according to another embodiment of the present invention includes a display panel 32, a beam splitter 34, a background member 36, and a blocking member 33. The display panel 32 faces down to display images downward, the beam splitter 34 partially transmitting and partially reflecting incident light is disposed inclined to the display panel 32, and the background member 36 is disposed behind the beam splitter 34.

The blocking member 33 is disposed in front of the display panel 32, and may extend downward from the display panel 32. Although FIG. 3 shows that the blocking member 33 extends obliquely downward, the blocking member 33 may extend vertically downward. The blocking member 33 may block a player to see the display panel 32.

The display device 30 may further include a support 38 that supports the beam splitter 34 and the background member 36.

Other structures of the display device 30 may be substantially the same as the display device 20 described above with reference to FIG. 2A to FIG. 2C.

A display device for a gaming machine according to embodiments of the present invention is described with reference to FIG. 4 to FIG. 7B.

Figure 4:
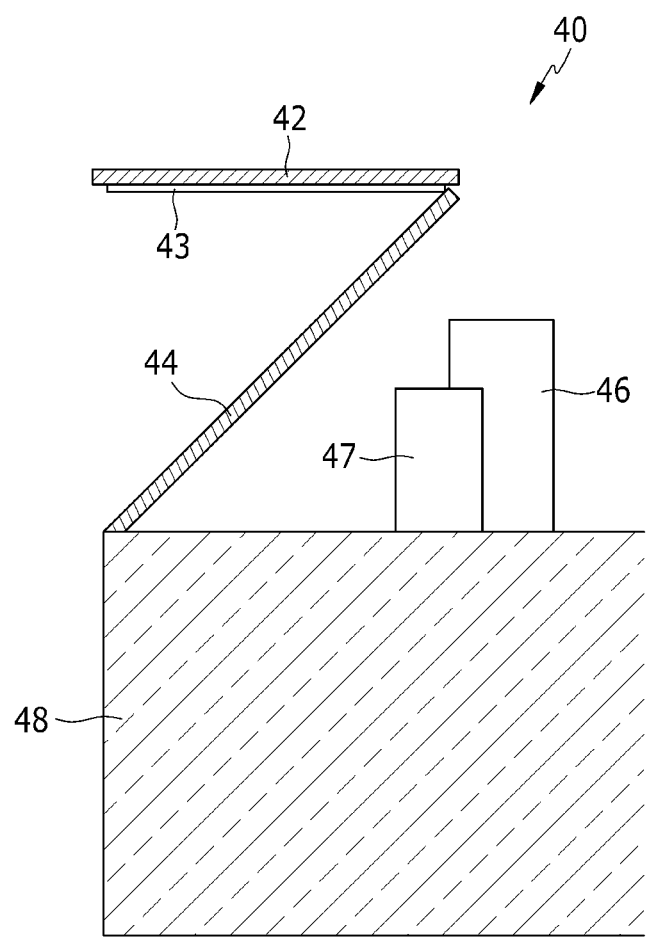
FIG. 4 is a schematic lateral view of a display device for a gaming machine according to an embodiment of the present invention.
Figure 5A:
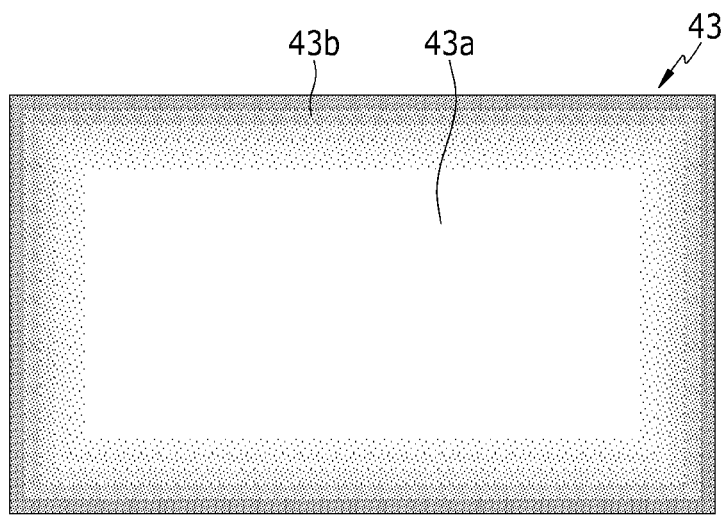
FIG. 5A is a schematic plan view of a filter for a display device according to an embodiment of the present invention.
Figure 5B:
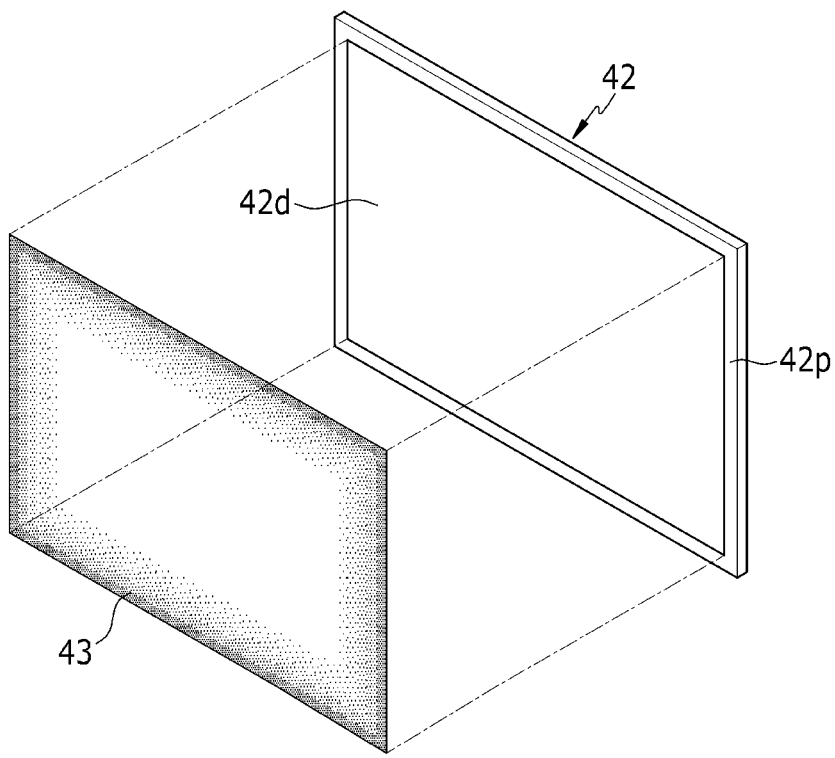
FIG. 5B is a schematic exploded view of the filter shown in FIG. 5A and a display panel for a display device.
Figure 6A:
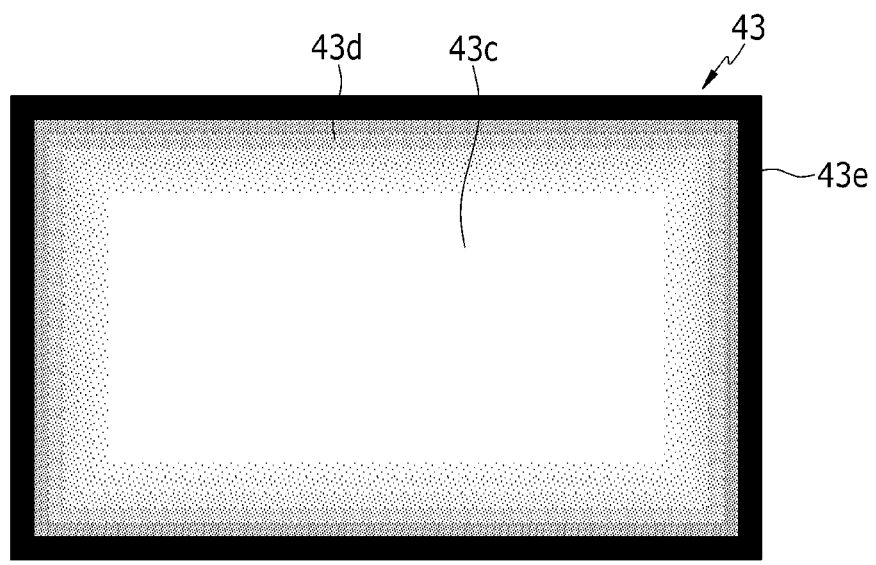
FIG. 6A is a schematic plan view of a filter for a display device according to another embodiment of the present invention.
Figure 6B:
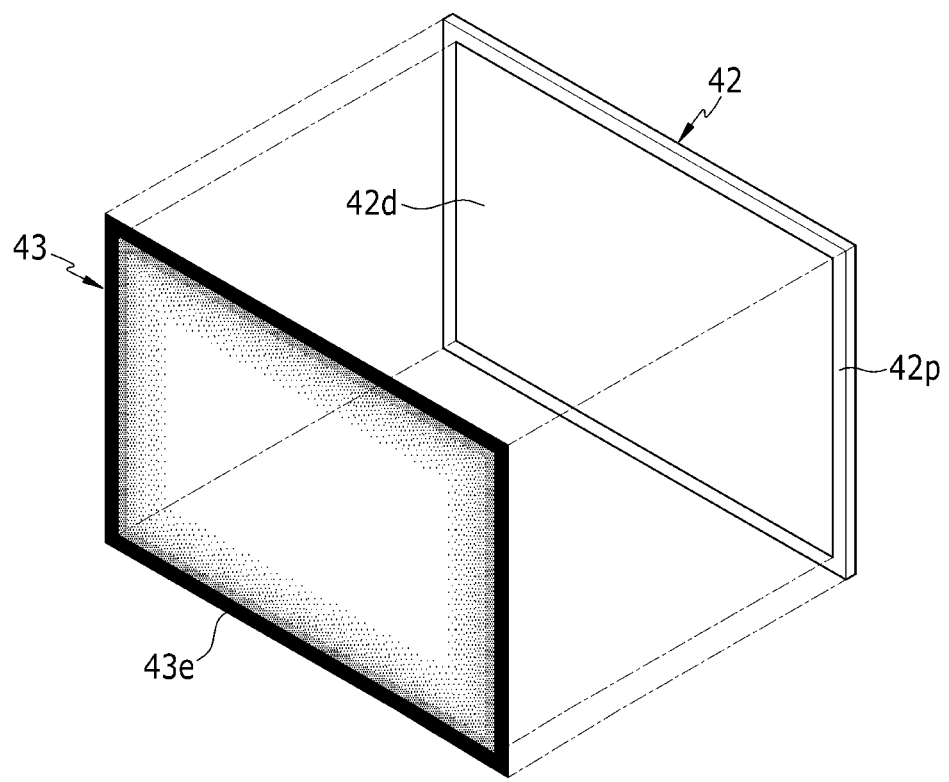
FIG. 6B is a schematic exploded view of the filter shown in FIG. 6A and a display panel for a display device.
Figure 7A:
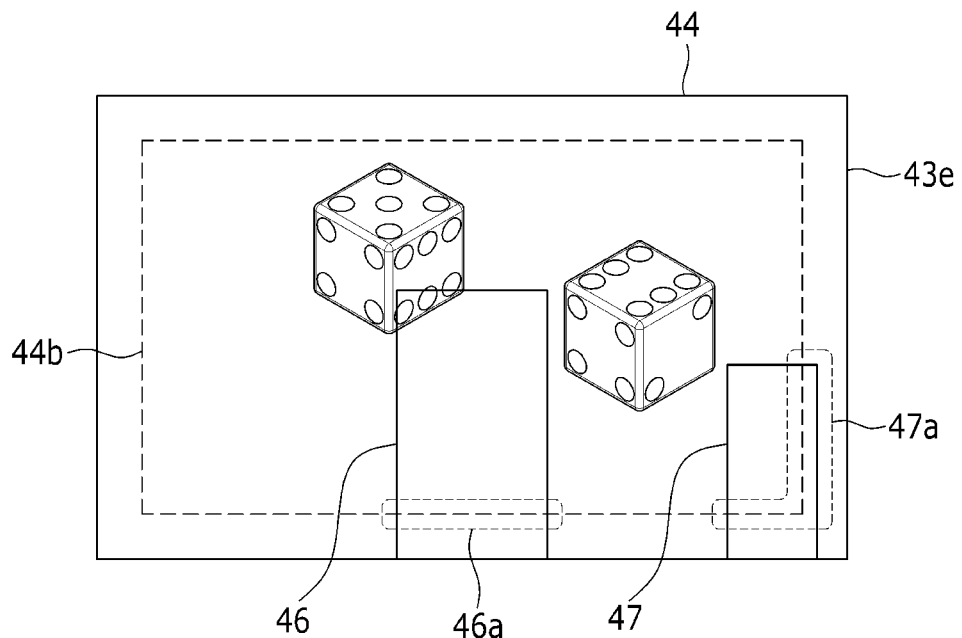
FIG. 7A illustrates an exemplary image on a beam splitter of a display device without a filter.
Figure 7B:
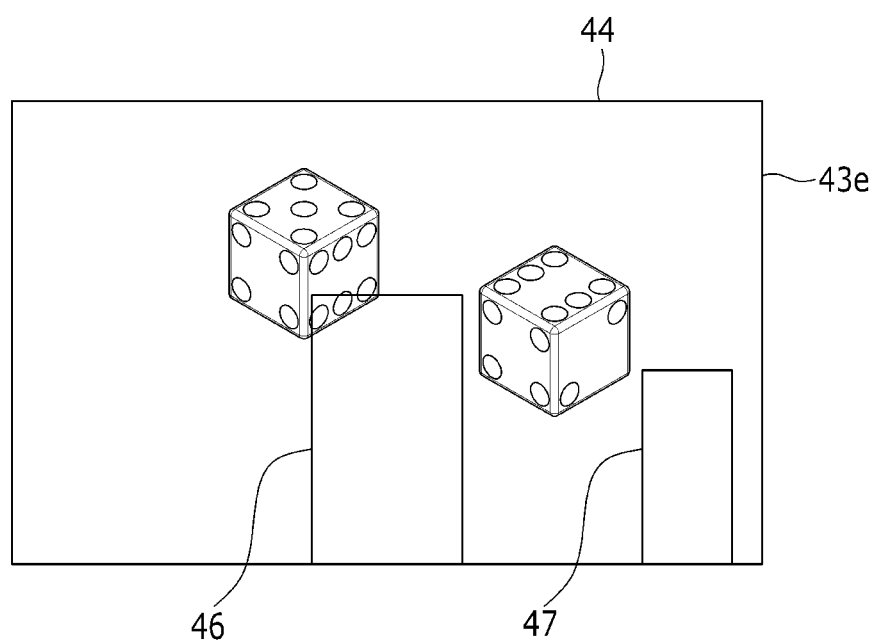
FIG. 7B illustrates an exemplary image on a beam splitter of the display device shown in FIG. 4 to FIG. 6B.

FIG. 4 is a schematic lateral view of a display device for a gaming machine according to an embodiment of the present invention, FIG. 5A is a schematic plan view of a filter for a display device according to an embodiment of the present invention, FIG. 5B is a schematic exploded view of the filter shown in FIG. 5A and a display panel for a display device, FIG. 6A is a schematic plan view of a filter for a display device according to another embodiment of the present invention, FIG. 6B is a schematic exploded view of the filter shown in FIG. 6A and a display panel for a display device, FIG. 7A illustrates an exemplary image on a beam splitter of a display device without a filter, and FIG. 7B illustrates an exemplary image on a beam splitter of the display device shown in FIG. 4 to FIG. 6B.

Referring to FIG. 4, a display device 40 for a gaming machine according to another embodiment of the present invention includes a display panel 42, a beam splitter 44, background members 46 and 47, and a support 48. The display panel 42 faces down to display images downward, and the beam splitter 44 partially transmitting and partially reflecting incident light is disposed inclined to the display panel 42, and the background members 46 and 47 are disposed behind the beam splitter 44.

The display device 40 further includes a filter 43 disposed on the display panel 42.

According to an embodiment of the present invention, referring to FIG. 5A, the filter 43 may have a transparent area 43a and a translucent area 43b. The transparent area 43a of the filter 43 may occupy a most portion of an entire area of the filter 43, and may be disposed around a center of the filter 43. The translucent area 43b of the filter 43 may surround the transparent area 43a, and may be disposed near edges of the filter 43. The transparent area 43a of the filter 43 may fully transmit incident light, and the translucent area 43b of the filter 43 may partially transmit the incident light such that the transmittance of the incident light in the translucent area 43b may gradually increase from an edge of the filter 43 toward the central area 43a of the filter 43.

According to an embodiment of the present invention, referring to FIG. 5B, the display panel 42 may have a display area (or screen area) 42d displaying images and a peripheral area 42p surrounding the display area 42d. The filter 43 may match with the display area 42d of the display panel 42, for example, edges of the filter 43 may be aligned with edges of the display area 42d of the display panel 42.

According to another embodiment of the present invention, referring to FIG. 6A, the filter 43 may have a transparent area 43c, a translucent area 43d, and an opaque area 43e. The transparent area 43c of the filter 43 may occupy a most portion of an entire area of the filter 43, and may be disposed around a center of the filter 43. The translucent area 43d of the filter 43 may surround the transparent area 43a like a band, and the opaque area 43e of the filter 43 may surround the translucent area 43d and may be disposed near edges of the filter 43. The transparent area 43c of the filter 43 may fully transmit incident light, and the opaque area 43e of the filter 43 may fully block incident light. The translucent area 43d of the filter 43 may partially transmit the incident light such that the transmittance of the incident light in the translucent area 43d may gradually increase from the opaque area 43e to the central area 43a of the filter 43.

Referring to FIG. 6B, the filter 43 may match with an entire area of the display panel 42, and the opaque area 43e of the filter 43 may match with a peripheral area 42p of the display panel 42 such that inner boundaries of the opaque area 43e of the filter 43 may be aligned with inner boundaries of the peripheral area 42p of the display panel 42.

As described above, the filter 43 has the translucent area 43b or 43d having the light transmittance gradually decreasing as goes toward the edges of the filter 43, and thus the filter 43 may cause images from the display panel 42 to be darker as goes toward the edges of the display panel 42 such that the edges of the display panel 42 may not be easily perceived.

For example, referring to FIG. 7A, if the display device 40 does not include the filter 43, the luminance of light, which is emitted from the display panel 42 and reflected by the beam splitter 44, may abruptly change near positions 44b corresponding to boundaries of the display area 42d of the display panel 42. Therefore, a player may recognize the presence of the display 42. Furthermore, the light near the boundary positions 44b may make images of the background members 46 and 47 be blurred as if portions 46a and 47a of the background members 46 and 47 near the boundary positions 44b were fogbound.

However, referring to FIG. 7B, the filter 43 may make the light luminance gradually change near positions 44b corresponding to the boundaries of the display area 42d of the display panel 42, and thus a player may not easily perceive the display panel 42. Moreover, the portions 6a and 47a of the background members 46 and 47 near the boundary positions 44b may be relatively clear since corresponding portions of the images from the display panel 42 is significantly blocked and thus relatively feeble.

Other structures of the display device 40 may be substantially the same as the display device 20 described above with reference to FIG. 2A to FIG. 2C. In addition, the display device 40 may further include the blocking member 13 described above with reference to FIG. 3.

The display devices for a gaming machine shown in FIG. 1 to FIG. 7B may be modified such that images displayed by the display devices may be shown in various directions. For example, two or more beam splitters may be used in multi-directional display.

Figure 8A:
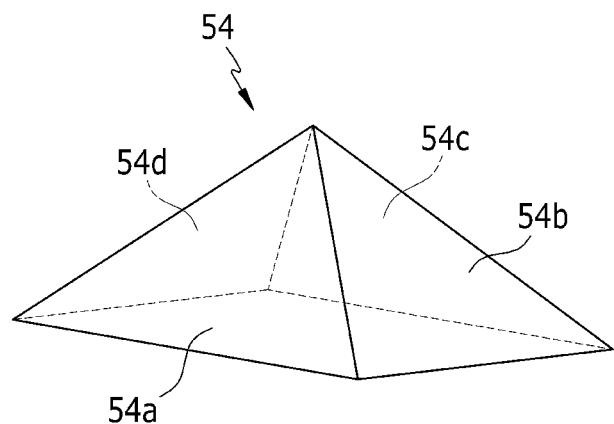
FIG. 8A is a schematic perspective view of a mirror assembly for a display device of a gaming machine according to an embodiment of the present invention.
Figure 8B:
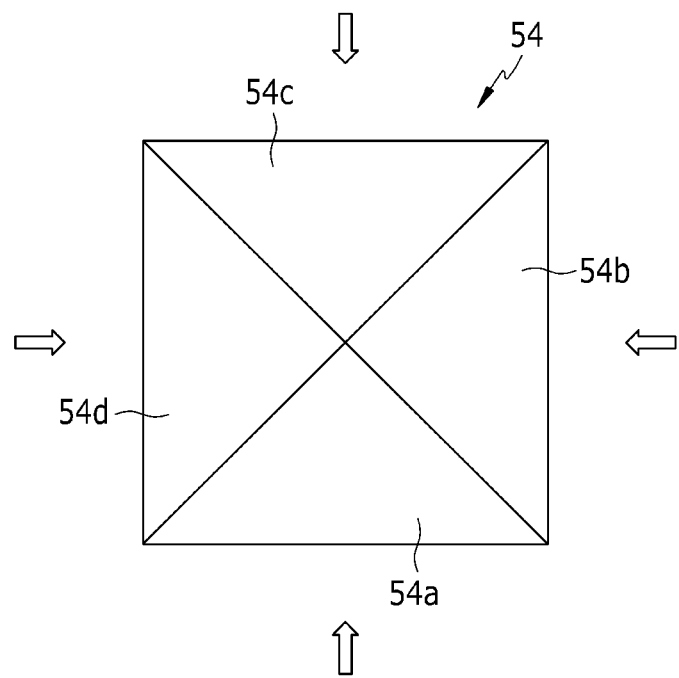
FIG. 8B is a schematic top view of the minor assembly shown in FIG. 8A.

FIG. 8A is a schematic perspective view of a mirror assembly for a display device of a gaming machine according to an embodiment of the present invention, and FIG. 8B is a schematic top view of the mirror assembly shown in FIG. 8A.

Referring to FIG. 8A and FIG. 8B, a minor assembly 54 for a display device of a gaming machine according to an embodiment of the present invention includes four beam splitters 54a, 54b, 54c and 54d. Each of the beam splitters 54a, 54b, 54c and 54d may be triangular, and the beam splitters 54a, 54b, 54c and 54d may form a pyramid such that images reflected by the beam splitters 54a, 54b, 54c and 54d may be seen from four directions as shown in FIG. 8B. The beam splitters 54a, 54b, 54c and 54d may have substantially the same shape from each other for symmetrical view, and, for example, each of the beam splitters 54a, 54b, 54c and 54d may a shape of an equilateral triangle.

Display devices for a gaming machine including the minor assembly 54 shown in FIG. 8A and FIG. 8B according to embodiments of the present invention are described with reference to FIG. 9A to FIG. 12B.

Figure 9A:
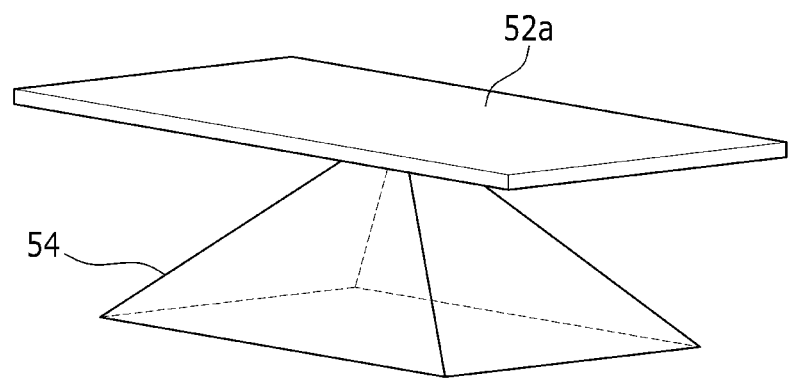
FIG. 9A is a schematic perspective view of a display device for a gaming machine according to an embodiment of the present invention.
Figure 9B:
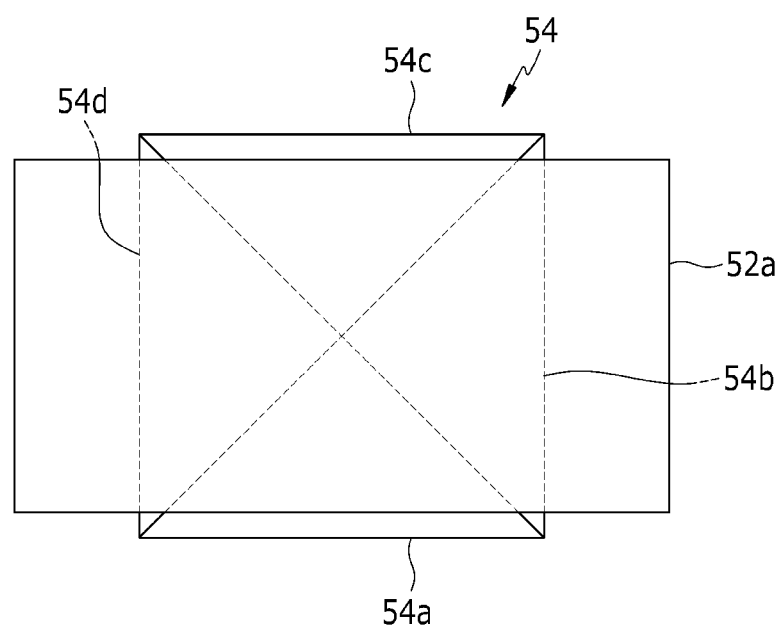
FIG. 9B is a schematic plan view of the display device shown in FIG. 9A.
Figure 10A:
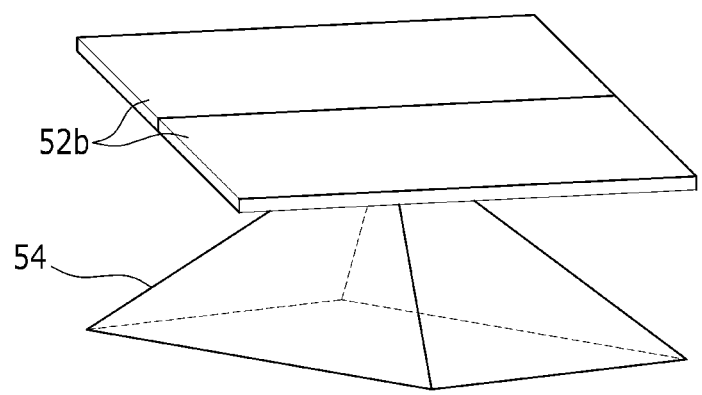
FIG. 10A is a schematic perspective view of a display device for a gaming machine according to an embodiment of the present invention.
Figure 10B:
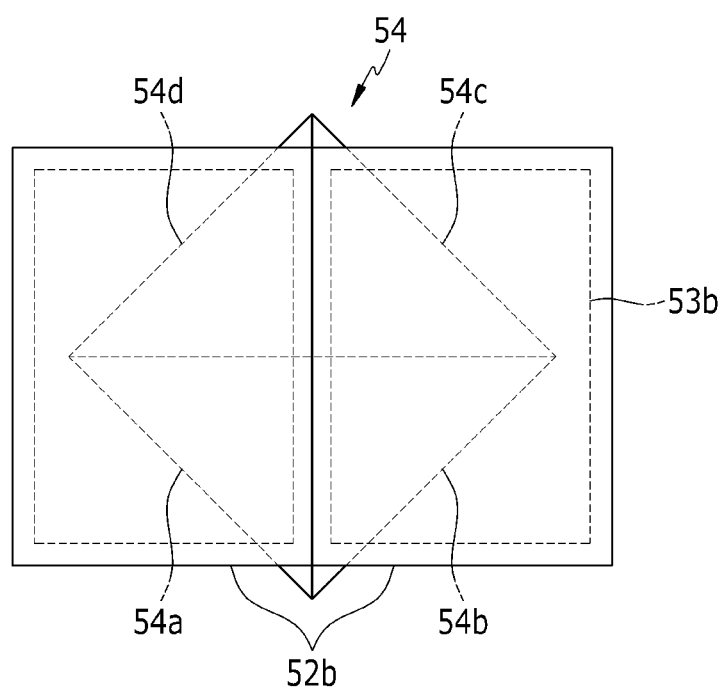
FIG. 10B is a schematic plan view of the display device shown in FIG. 10A.
Figure 11A:
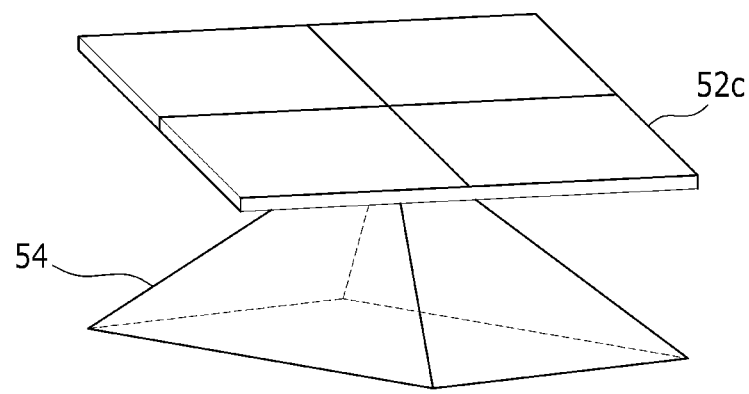
FIG. 11A is a schematic perspective view of a display device for a gaming machine according to an embodiment of the present invention.
Figure 11B:
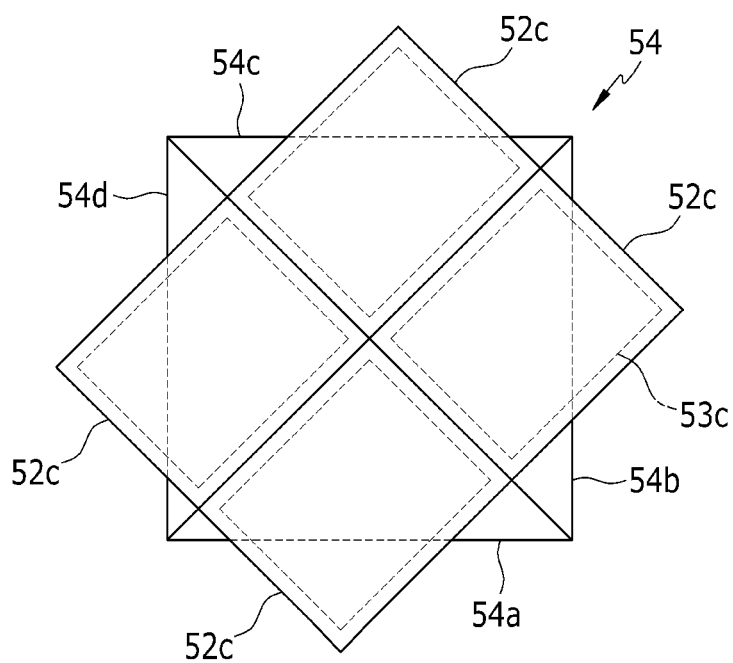
FIG. 11B is a schematic plan view of the display device shown in FIG. 11A.
Figure 12A:
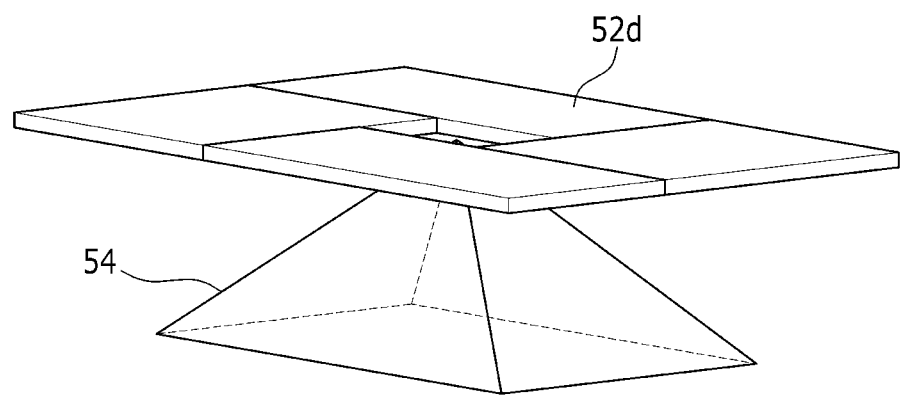
FIG. 12A is a schematic perspective view of a display device for a gaming machine according to an embodiment of the present invention.
Figure 12B:
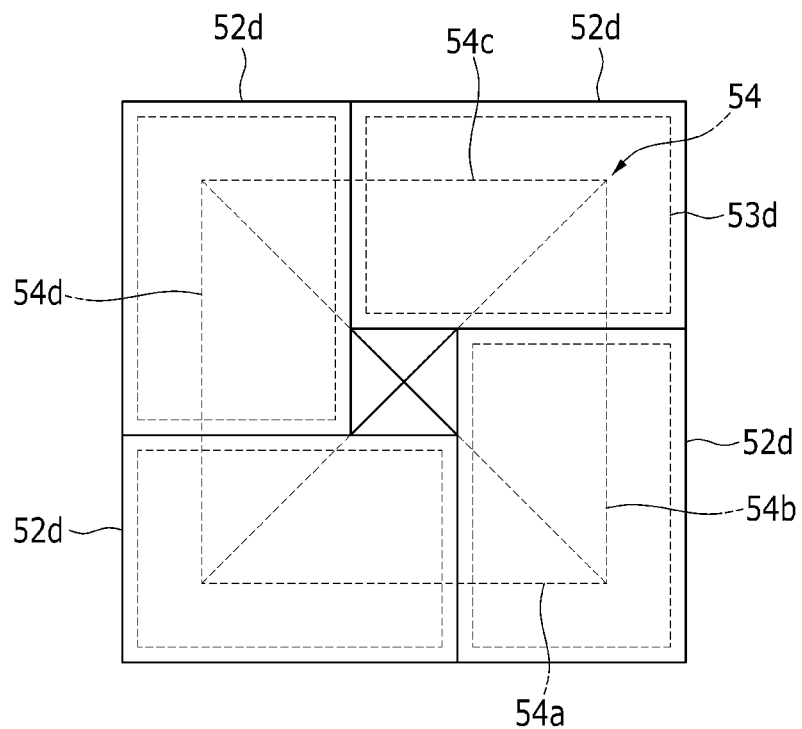
FIG. 12B is a schematic plan view of the display device shown in FIG. 12A.

FIG. 9A is a schematic perspective view of a display device for a gaming machine according to an embodiment of the present invention, FIG. 9B is a schematic plan view of the display device shown in FIG. 9A, FIG. 10A is a schematic perspective view of a display device for a gaming machine according to an embodiment of the present invention, FIG. 10B is a schematic plan view of the display device shown in FIG. 10A, FIG. 11A is a schematic perspective view of a display device for a gaming machine according to an embodiment of the present invention, FIG. 11B is a schematic plan view of the display device shown in FIG. 11A, FIG. 12A is a schematic perspective view of a display device for a gaming machine according to an embodiment of the present invention, and FIG. 12B is a schematic plan view of the display device shown in FIG. 12A.

Referring to FIG. 9A and FIG. 9B, a display device for a gaming machine according to an embodiment of the present invention includes a display panel 52a in addition to the minor assembly 54 including the four beam splitters 54a, 54b, 54c and 54d. The display panel 52a faces down to display images downward, and the display panel 52a overlaps the four beam splitters 54a, 54b, 54c and 54d when viewed from a top as shown in FIG. 9B.

The display panel 52a may be a flat panel display, for example, a liquid crystal display ("LCD"). The size and the shape of the display panel 52a may be selected so that the display panel 52a may fit the minor assembly 54, for example, the display panel 52a may be square. However, custom-made display panels may be unavailable, and, although available, may require additional costs. Therefore, the display panel 52a may be a commercially available one.

According to an embodiment of the present invention, a diagonal of a base of the minor assembly 54 may be about 600 mm, and the display panel 52a may be a 42 inch wide LCD panel of about 928 mm×about 523 mm.

The display device according to this embodiment may exhibit low power consumption since the display device has a single display panel 52a. In addition, the display device according to this embodiment may have a simple structure. Moreover, it is easy to set the display device since peripheries of the display panel 52a, which do not contribute to displaying images, may not be shown to a player although the display panel 52a and the minor assembly 54 are not exactly aligned with each other.

However, the display device according to this embodiment may have a low resolution since a single display panel 52a displays images for the four beam splitters 54a, 54b, 54c and 54d. In addition, the display panel 52a may have large unused portions that do not overlap the minor assembly 54 and protrude beyond the mirror assembly 54, and the protruded portions may spoil the sight of the gaming machine. Furthermore, the mirror assembly 54 may have large portions that do not overlap the display panel 52a.

Referring to FIG. 10A and FIG. 10B, a display device for a gaming machine according to an embodiment of the present invention includes a pair of display panels 52b in addition to the minor assembly 54 including the four beam splitters 54a, 54b, 54c and 54d. The display panels 52b face down to display images downward, and each of the display panels 52b overlaps two of the four beam splitters 54a, 54b, 54c and 54d when viewed from a top as shown in FIG. 10B.

According to an embodiment of the present invention, a diagonal of a base of the minor assembly 54 may be about 600 mm, and each of the display panels 52b may be a 32 inch wide LCD panel of about 706 mm×about 398 mm.

The display device according to this embodiment may be still effective since images for the four beam splitters 54a may be displayed by only two display panels 52b.

However, the display device according to this embodiment may exhibit relatively high power consumption compared with the display device shown in FIG. 9A and FIG. 9B. In addition, the display panel 52a may still have large unused portions that do not overlap the minor assembly 54. Furthermore, peripheries 53b of the display panel 52a such as a bezel, which do not contribute to displaying images, may be shown to a player.

Referring to FIG. 11A and FIG. 11B, a display device for a gaming machine according to an embodiment of the present invention includes four display panels 52c in addition to the minor assembly 54 including the four beam splitters 54a, 54b, 54c and 54d. The display panels 52c face down to display images downward, and each of the display panels 52c overlaps one of the four beam splitters 54a, 54b, 54c and 54d when viewed from a top as shown in FIG. 11B.

According to an embodiment of the present invention, a diagonal of a base of the minor assembly 54 may be about 600 mm, and each of the display panels 52c may be a 15 inch LCD panel of about 305 mm×about 229 mm.

The display device according to this embodiment may have a relatively effective layout, and seems to be easily combined since the display panels 52c are small. In addition, unused portions of the display panels 52c may be relatively small.

However, the display device according to this embodiment may require reversed images for adjacent display panels 52c. In addition, the time required for combining the display device may be longer than expected. Furthermore, peripheries 53b of the display panel 52a such as a bezel, which do not contribute to displaying images, may be easily recognized by a player.

Referring to FIG. 12A and FIG. 12B, a display device for a gaming machine according to an embodiment of the present invention includes four display panels 52d in addition to the minor assembly 54 including the four beam splitters 54a, 54b, 54c and 54d. The display panels 52d face down to display images downward. Each of the display panels 52d overlaps two of the four beam splitters 54a, 54b, 54c and 54d, and each of the beam splitters 54a, 54b, 54c and 54d overlaps two of the display panels 52d when viewed from a top as shown in FIG. 12B.

According to an embodiment of the present invention, a diagonal of a base of the minor assembly 54 may be about 600 mm, and each of the display panels 52c may be a 21.5 inch wide LCD panel of about 476 mm×about 268 mm.

The display device according to this embodiment may sufficiently use the four beam splitters 54a, 54b, 54c and 54d although the degree of the use may depend on displayed images.

However, the display device according to this embodiment may exhibit high power consumption. In addition, the image displayed by each of the display panels 52d may be complicated. Furthermore, the area occupied by the display panels 52d may be large and thus a marginal space in a vertical direction may be reduced.

Moreover, each of the display devices shown in FIG. 9A to FIG. 12B may have a relatively small display area shown to a player. For example, the display devices shown in FIG. 9A to FIG. 12B may be suitable for dice games such as craps and sic bo, which requires a relatively small display area. However, the display devices shown in FIG. 9A to FIG. 12B may be too small to use in roulette that requires a relatively large display area.

A display device for a gaming machine according to an embodiment of the present invention is described in detail with reference to FIG. 13A and FIG. 13B.

Figure 13A:
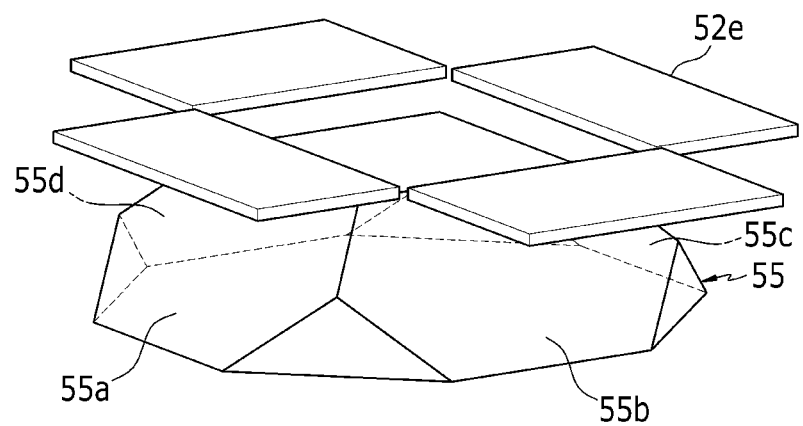
FIG. 13A is a schematic perspective view of a display device for a gaming machine according to an embodiment of the present invention.
Figure 13B:
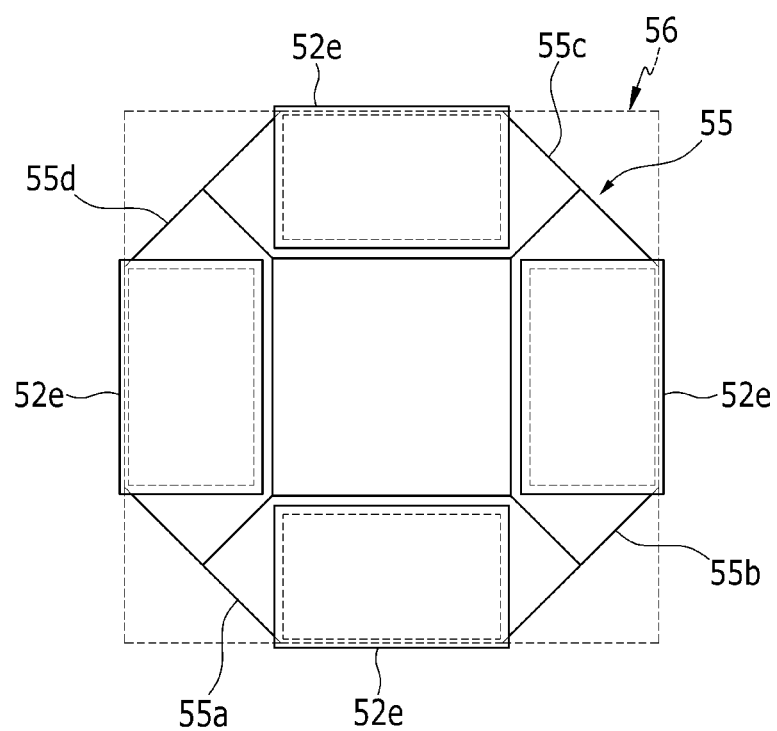
FIG. 13B is a schematic plan view of the display device shown in FIG. 13A.

FIG. 13A is a schematic perspective view of a display device for a gaming machine according to an embodiment of the present invention, and FIG. 13B is a schematic plan view of the display device shown in FIG. 13A.

Referring to FIG. 13A and FIG. 13B, a display device for a gaming machine according to an embodiment of the present invention includes four display panels 52e and a mirror assembly 55 including four beam splitters 55a, 55b, 55c and 55d. The mirror assembly 55 has a shape of a modified pyramid having five cut corners, and thus each of the beam splitters 55a, 55b, 55c and 55d is hexagonal.

The display panels 52e face down to display images downward. The display panels 52e are arranged such that each of the display panels 52d overlaps one of the four beam splitters 54a, 54b, 54c and 54d, and each of the beam splitters 54a, 54b, 54c and 54d overlaps one of the display panels 52d when viewed from a top as shown in FIG. 13B.

According to an embodiment of the present invention, a distance from a base edge of the mirror assembly 54 to an opposite base edge may be about 600 mm, and each of the display panels 52c may be a 21.5 inch wide LCD panel of about 476 mm×about 268 mm.

The display device according to this embodiment may have a sufficiently large display area since an entire image from each of the display panels 52e may be fully reflected by the beam splitters 54a, 54b, 54c and 54d while the display device occupy substantially the same or slightly larger area compared with the above-described embodiments. Therefore, the display device may be used in roulette that requires a large display area.

The display devices shown in FIG. 9A to 13B may further include the background member 26 described above with reference to FIG. 2A to FIG. 2C, the blocking member 13 described above with reference to FIG. 3, and the filter 43 described above with reference to FIG. 4 to FIG. 7B.

The background member 26 may be changed with a background image, which will be described with reference to FIG. 14A to FIG. 15C.

A display device for a gaming machine according to an embodiment of the present invention is described in detail with reference to FIG. 14A to FIG. 14D.

Figure 14A:
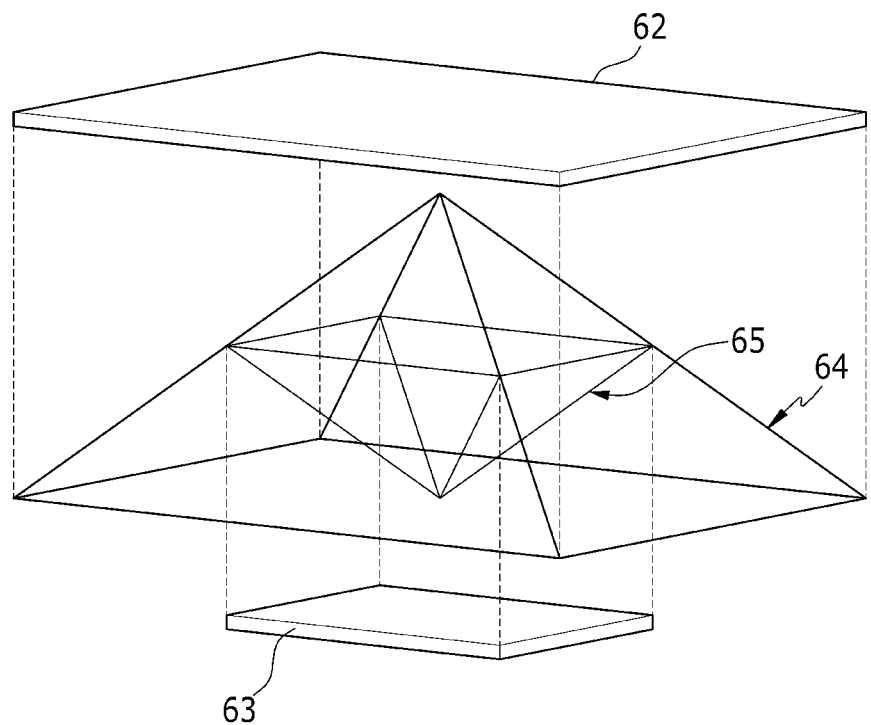
FIG. 14A is a schematic perspective view of a display device for a gaming machine according to an embodiment of the present invention.
Figure 14B:
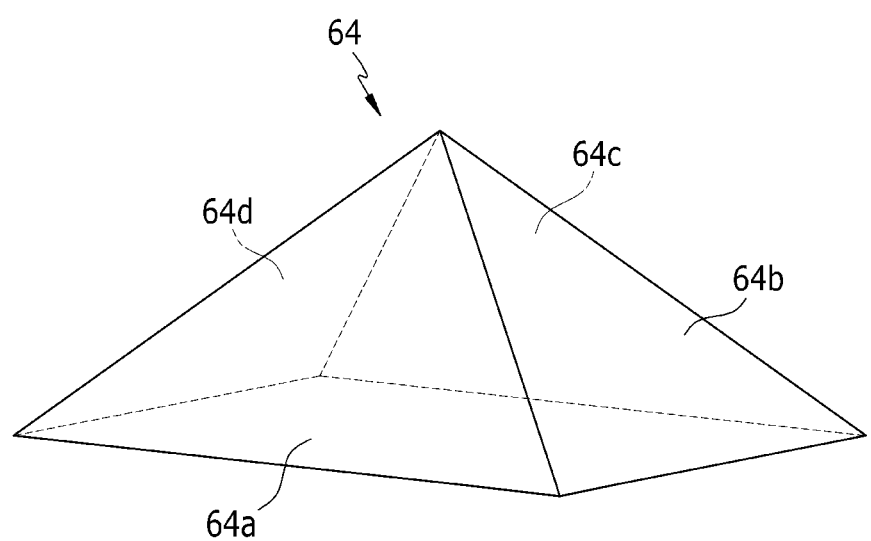
FIG. 14B is a schematic perspective view of an external mirror assembly of the display device shown in FIG. 14A.
Figure 14C:
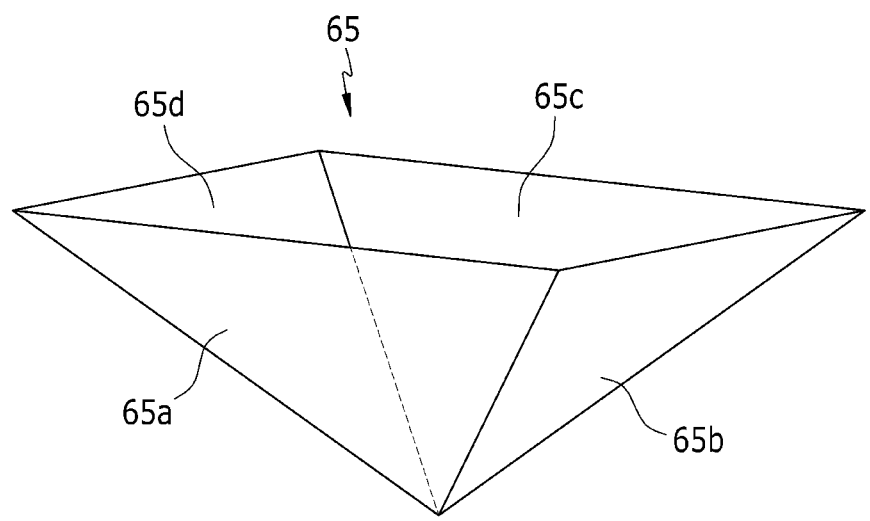
FIG. 14C is a schematic perspective view of an internal mirror assembly of the display device shown in FIG. 14A.
Figure 14D:
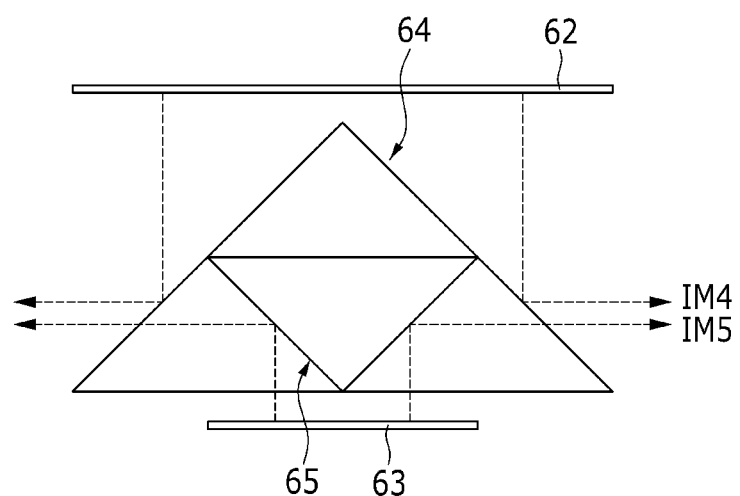
FIG. 14D is a schematic lateral view of the display device shown in FIG. 14A.

FIG. 14A is a schematic perspective view of a display device for a gaming machine according to an embodiment of the present invention, FIG. 14B is a schematic perspective view of an external minor assembly of the display device shown in FIG. 14A, FIG. 14C is a schematic perspective view of an internal mirror assembly of the display device shown in FIG. 14A, and FIG. 14D is a schematic lateral view of the display device shown in FIG. 14A.

Referring to FIG. 14A to FIG. 14D, a display device for a gaming machine according to an embodiment of the present invention includes an upper display panel 62, a lower display panel 63, an external mirror assembly 64, and an internal minor assembly 65.

The upper display panel 62 faces down to display game images IM4 downward, and the lower display panel 63 faces up to display background images IM5 upward. The upper display panel 62 may be substituted with a plurality of display panels as shown in FIG. 10A to FIG. 13B.

The external mirror assembly 64 for a display device of a gaming machine according to an embodiment of the present invention includes four beam splitters 64a, 64b, 64c and 64d. Each of the beam splitters 64a, 64b, 64c and 64d may be triangular, and the beam splitters 64a, 64b, 64c and 64d may form a pyramid such that game images IM4 displayed by the upper display panel 62 may be reflected by the beam splitters 64a, 64b, 64c and 64d as shown in FIG. 14D. The beam splitters 64a, 64b, 64c and 64d may have substantially the same shape from each other for symmetrical view, and, for example, each of the beam splitters 64a, 64b, 64c and 64d may a shape of an equilateral triangle.

The internal mirror assembly 65 for a display device of a gaming machine according to an embodiment of the present invention includes four beam splitters 65a, 65b, 65c and 65d. Each of the beam splitters 65a, 65b, 65c and 65d may be triangular, and the beam splitters 65a, 65b, 65c and 65d may form a reversed pyramid such that background images IM5 displayed by the lower display panel 63 may be reflected by the beam splitters 65a, 65b, 65c and 65d as shown in FIG. 14D. The beam splitters 65a, 65b, 65c and 65d may have substantially the same shape from each other for symmetrical view, and, for example, each of the beam splitters 65a, 65b, 65c and 65d may a shape of an equilateral triangle.

Therefore, a player may see a mixture of the game images IM4 and the background images IM5.

At least one of the external mirror assembly 64 and the internal mirror assembly 65 may be substituted with the mirror assembly 55 shown in FIG. 13A and 13B.

A display device for a gaming machine according to another embodiment of the present invention is described in detail with reference to FIG. 15A, FIG. 15B, and FIG. 15C.

Figure 15A:
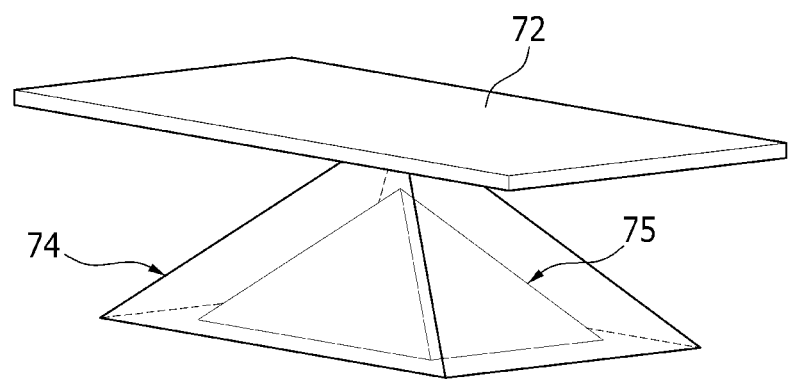
FIG. 15A is a schematic perspective view of a display device for a gaming machine according to another embodiment of the present invention.
Figure 15B:
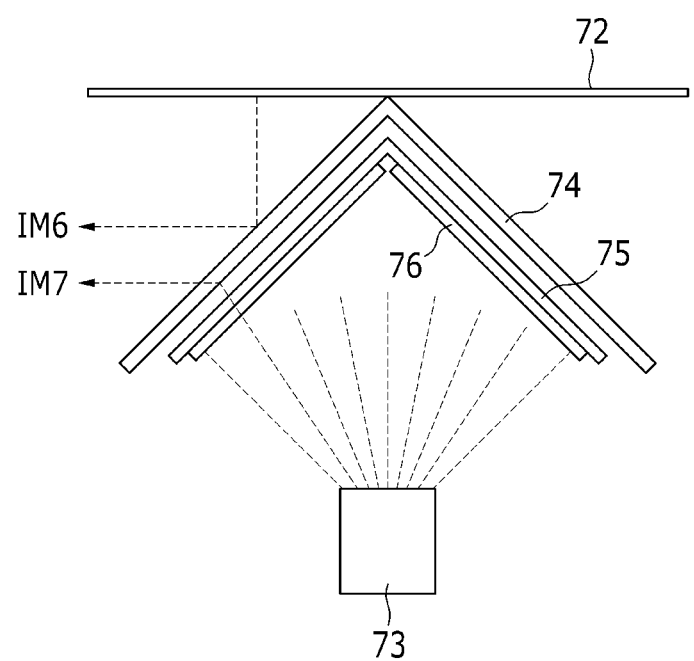
FIG. 15B is a schematic lateral view of a display device for a gaming machine shown in FIG. 15A.
Figure 15C:
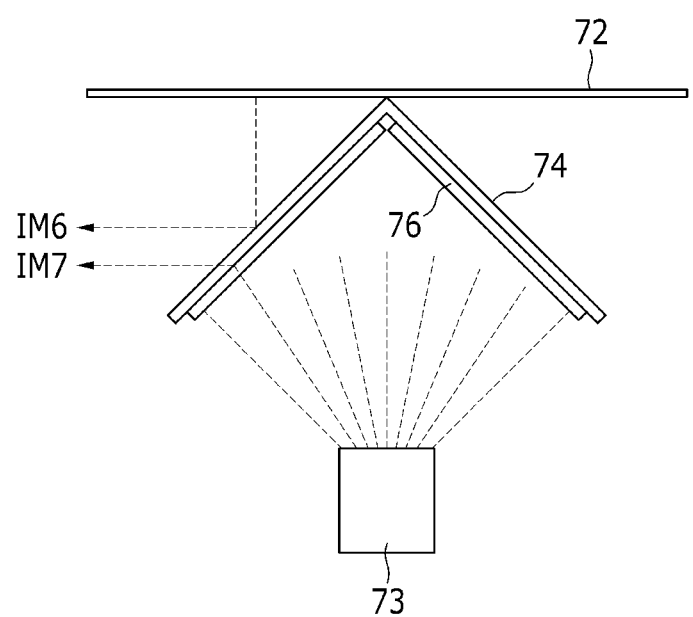
FIG. 15C is a schematic lateral view of a display device for a gaming machine according to another embodiment of the present invention.

FIG. 15A is a schematic perspective view of a display device for a gaming machine according to another embodiment of the present invention, FIG. 15B is a schematic lateral view of a display device for a gaming machine shown in FIG. 15A, and FIG. 15C is a schematic lateral view of a display device for a gaming machine according to another embodiment of the present invention.

Referring to FIG. 15A and 15B, a display device for a gaming machine according to an embodiment of the present invention includes a display panel 72, a projector 73, a mirror assembly 74, an image transmission member 75, and a plurality of screen members 76.

The display panel 72 faces down to display game images IM6 downward, and a projector 73 faces up to project background images IM7 upward. The display panel 72 may be substituted with a plurality of display panels as shown in FIG. 10A to FIG. 13B.

The minor assembly 74 may have beam splitters as shown in FIG. 8A and FIG. 8B or FIG. 13A and 13B. According to an embodiment of the present invention, the image transmission member 75 may include a plurality of transparent or translucent plates such as glass plates. According to another embodiment of the present invention, the image transmission member 75 may include a plurality of beam splitters as shown in FIG. 8A and FIG. 8B or FIG. 13A and 13B. The transparent plates or the beam splitters of the image transmission member 75 may be substantially parallel to the beam splitters of the mirror assembly 74.

The screen members 76 may be disposed on, for example, attached to outer surfaces of the image transmission member 75. However, the screen members 76 may be disposed on inner surfaces of the image transmission member 75. Each of the screen members 76 may include a colored transparent or translucent sheet. The screen members 76 may be omitted.

The background images IM7 projected by the projector 73 may pass through the image transmission member 75 with the screen member 76 and through the mirror assembly 74, and may overlap the game images IM6.

At least one of the mirror assembly 74 and the image transmission member 75 may be substituted with the minor assembly 55 shown in FIG. 13A and 13B.

Referring to FIG. 15C, a display device for a gaming machine according to an embodiment of the present invention includes a display panel 72, a projector 73, a minor assembly 74, and a plurality of screen members 76, like the display device shown in FIG. 15A and 15B. However, the display device shown in FIG. 15C may not include the image transmission member 75.

In detail, the display panel 72 faces down to display game images IM6 downward, and a projector 73 faces up to project background images IM7 upward. The mirror assembly 74 may have beam splitters as shown in FIG. 8A and FIG. 8B, and the screen members 76 may be disposed on, for example, attached to inner surfaces of the minor assembly 74. Each of the screen members 76 may include a colored transparent or translucent sheet.

The background images IM7 projected by the projector 73 may pass through the screen member 76 and through the mirror assembly 74, and may overlap the game images IM6.

The display devices shown in FIG. 14A to FIG. 15C may further include at least one of the background member 26 described above with reference to FIG. 2A to FIG. 2C, the blocking member 13 described above with reference to FIG. 3, and the filter 43 described above with reference to FIG. 4 to FIG. 7B.

The minor assembly 74 may be substituted with the minor assembly 55 shown in FIG. 13A and 13B.

A gaming machine according to an embodiment of the present invention is described with reference to FIG. 16 to FIG. 48.

Figure 16:
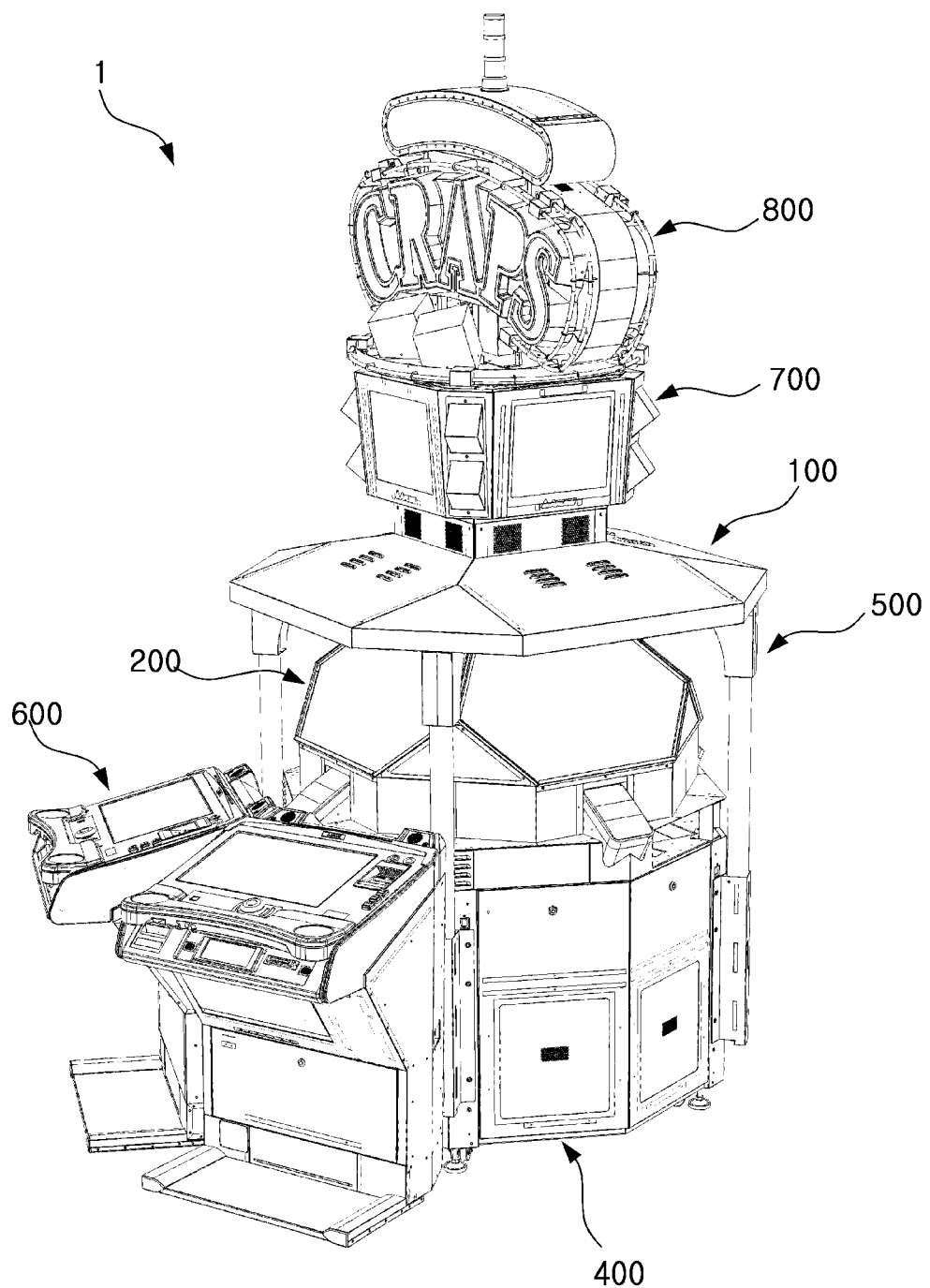
FIG. 16 is a schematic perspective view of a gaming machine according to an embodiment of the present invention.
Figure 17:
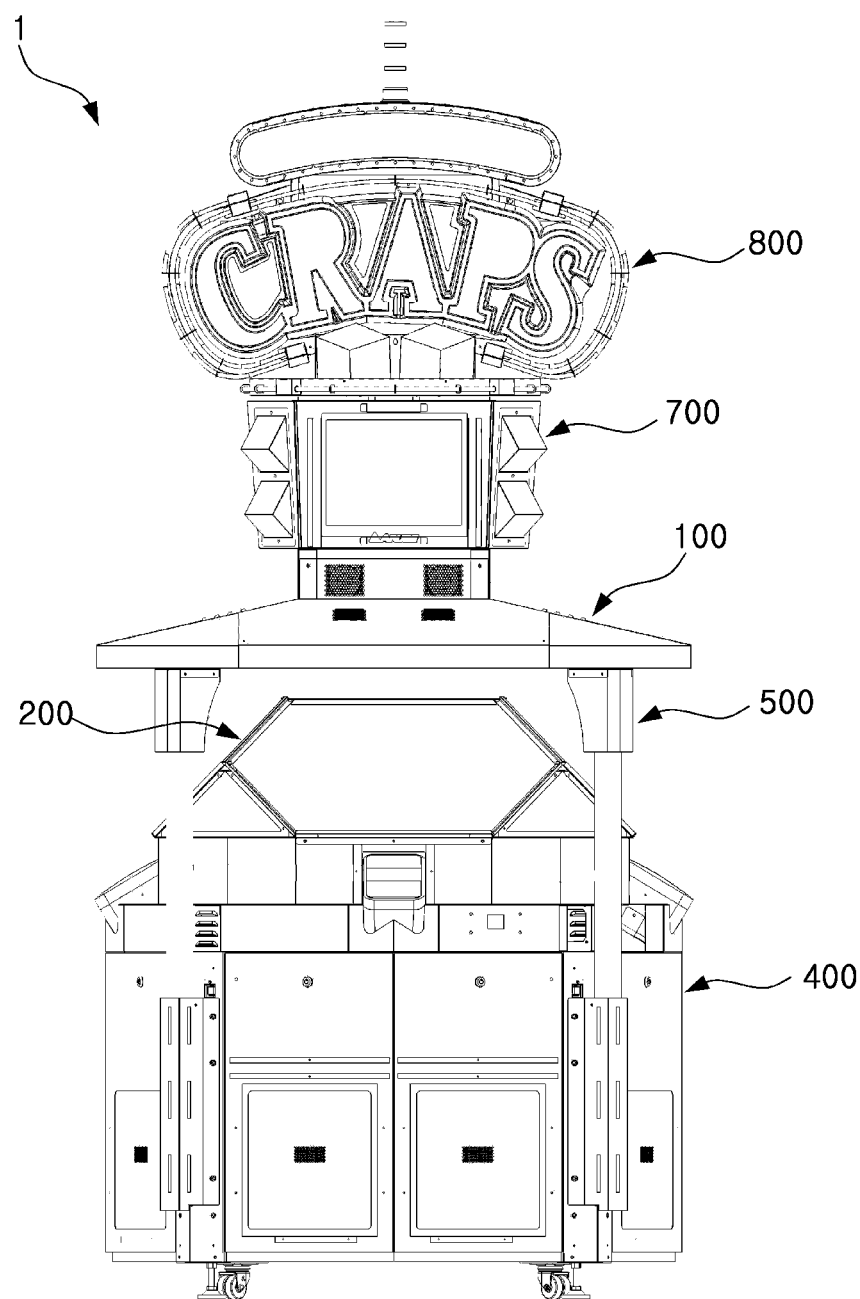
FIG. 17 is a schematic front view of the gaming machine shown in FIG. 16.
Figure 18:
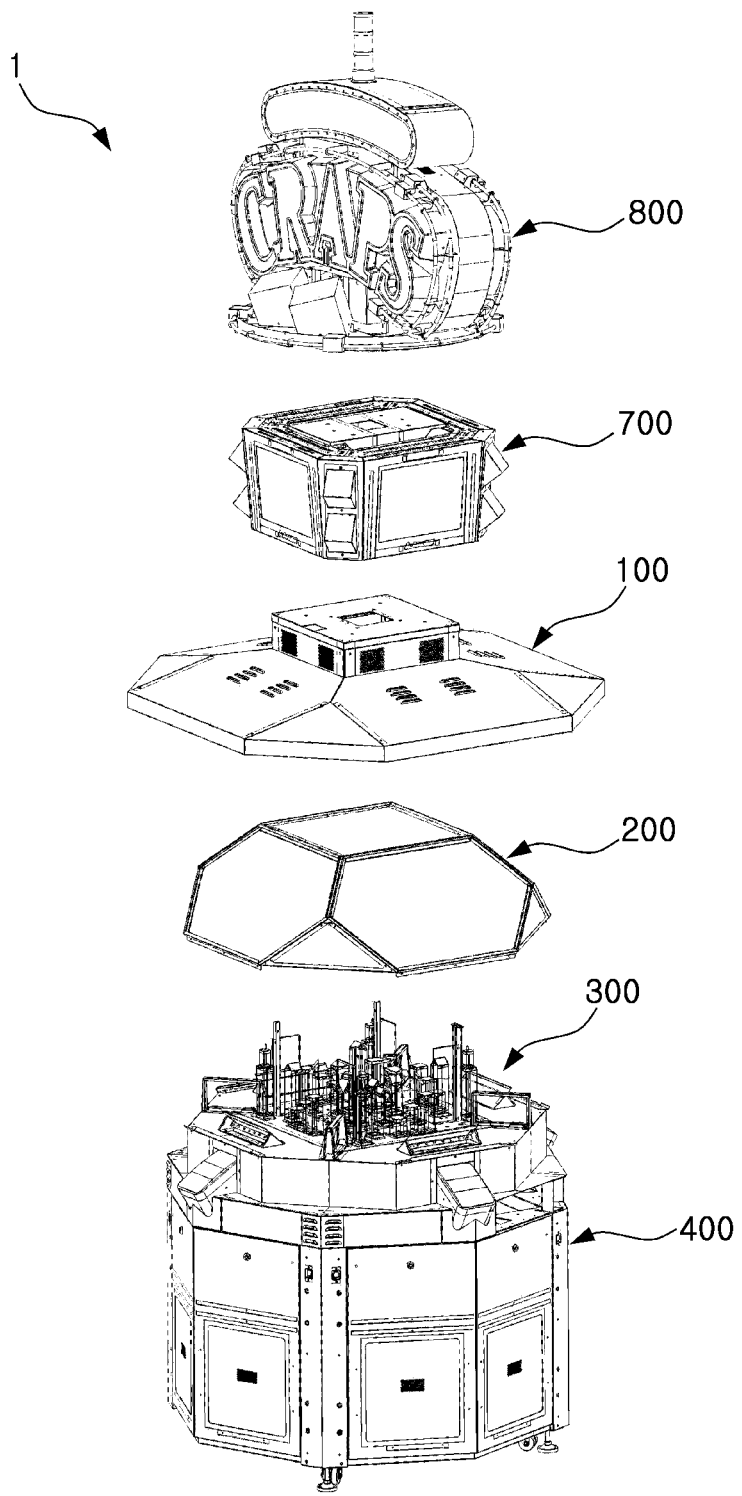
FIG. 18 is a schematic exploded view of the gaming machine shown in FIG. 16 except for post assemblies and player terminals.

First, an overall structure of the gaming machine is outlined with reference to FIG. 16 to FIG. 18.

FIG. 16 is a schematic perspective view of a gaming machine according to an embodiment of the present invention, FIG. 17 is a schematic front view of the gaming machine shown in FIG. 16, and FIG. 18 is a schematic exploded view of the gaming machine shown in FIG. 16 except for post assemblies and player terminals.

Referring to FIG. 16, a gaming machine 1 according to an embodiment of the present invention includes a primary display assembly 100, a mirror assembly 200, a background assembly 300, a base support 400, a plurality of post assemblies 500, a plurality of player terminals 600, a secondary display assembly 700, and a top sign 700. The background assembly 300 is disposed on the base support 400 and covered by the mirror assembly 200 including beam splitters or partial mirrors. The post assemblies 500 are fixed to the base support 400 and support the primary display assembly 100 that includes display panels having downward screens. The secondary display assembly 700 including a plurality of image display panels is disposed on the primary display assembly 100, and the top sign 800 is disposed on the secondary display assembly 700. Although the top sign 800 figures shows craps as an example of a game, the game is not limited to the craps. For example, the game may be sic bo or roulette.

A player may play a game using one of the player terminals 600 while looking at images on one of the partial minors of the mirror assembly 200. Some of the images may be reflected by the one of the partial mirrors after illuminated by one of the display panels and the others of the images may be images of the background assembly 300 after being transmitted through the one of the partial minors.

A structure of the base support 400 and the background assembly 300 of the gaming machine 1 is described in detail with reference to FIG. 19 to FIG. 27 as well as FIG. 16 to FIG. 18.

Figure 19:
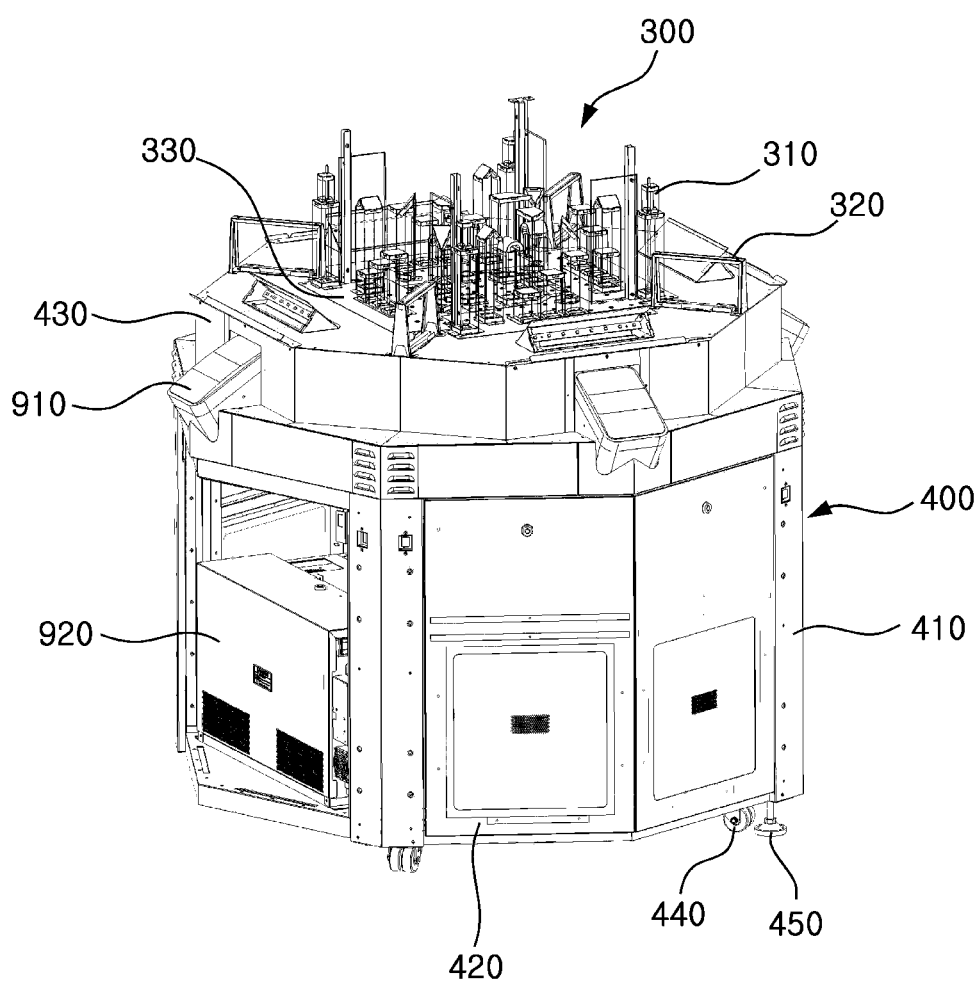
FIG. 19 is a schematic perspective view of the base support and the background assembly of the gaming machine shown in FIG. 16 to FIG. 18.
Figure 20:
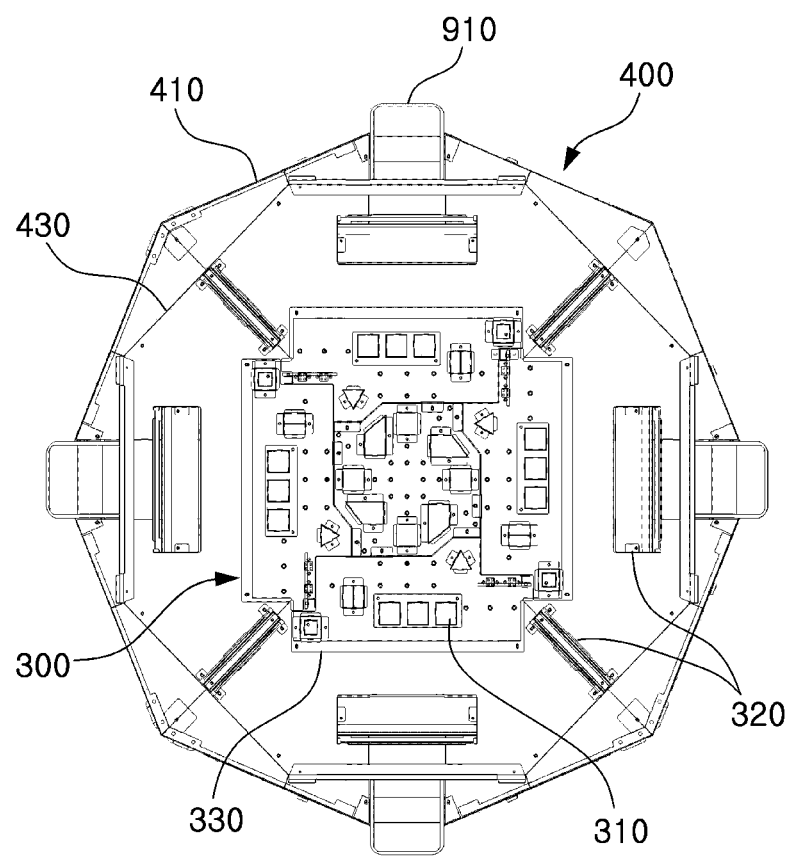
FIG. 20 is a schematic top view of the base support and the background assembly.
Figure 21:
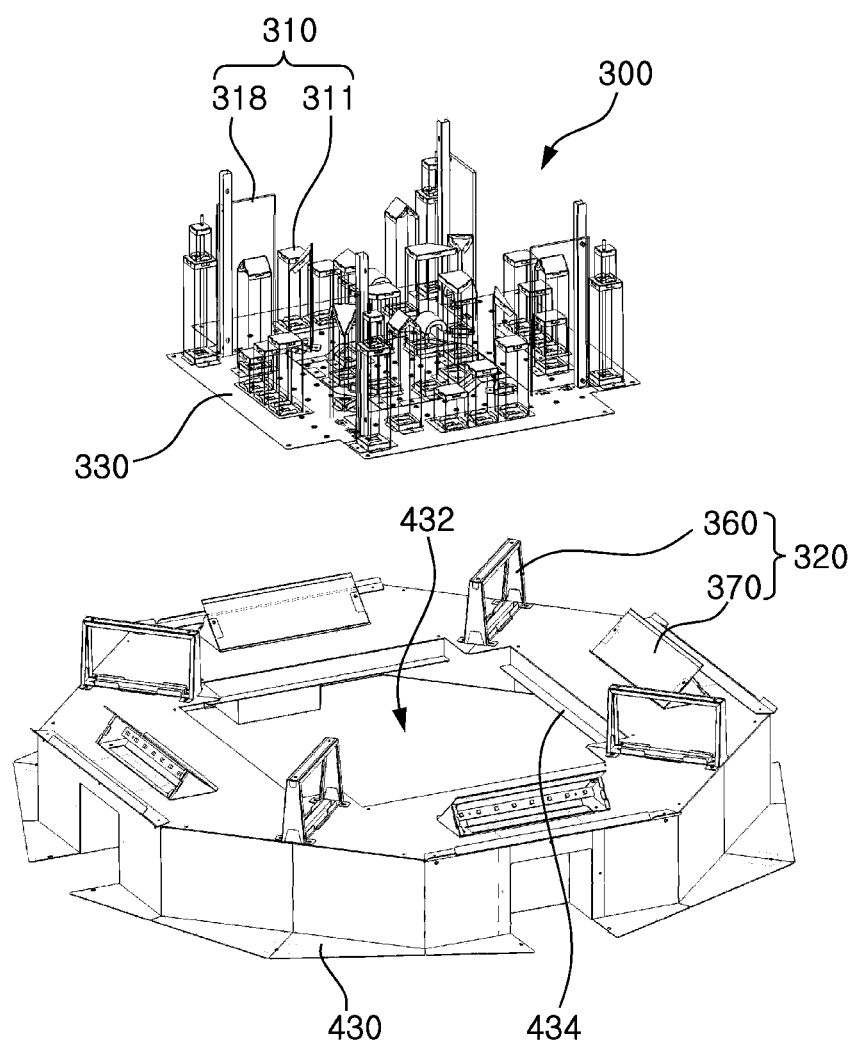
FIG. 21 is a schematic partially-exploded perspective view of a mirror support of the base support and the background assembly.
Figure 22:
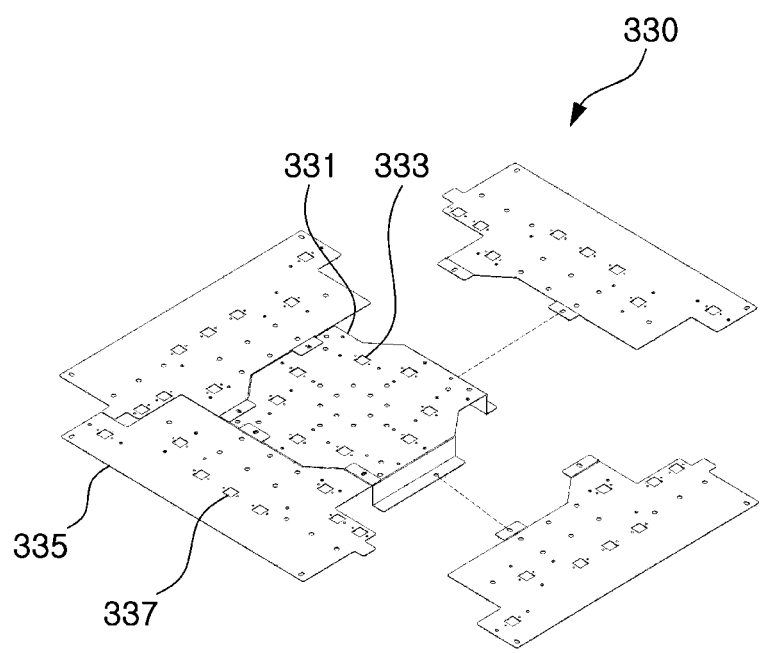
FIG. 22 is a schematic partially-exploded perspective view of base plates of the background assembly.
Figure 23:
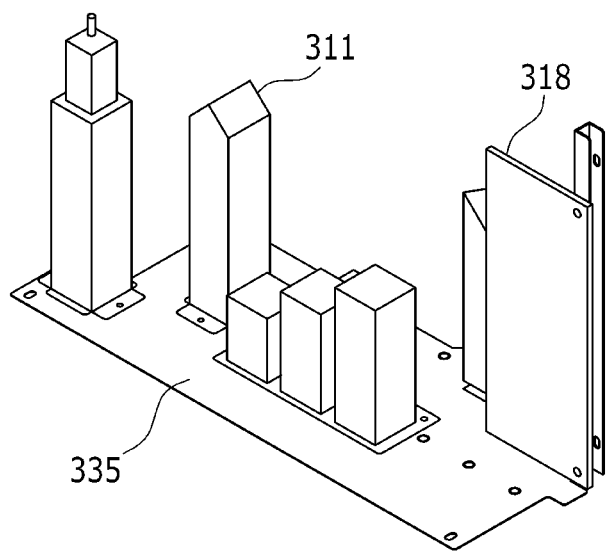
FIG. 23 is a schematic perspective view of a base plate and background members thereon.
Figure 24:
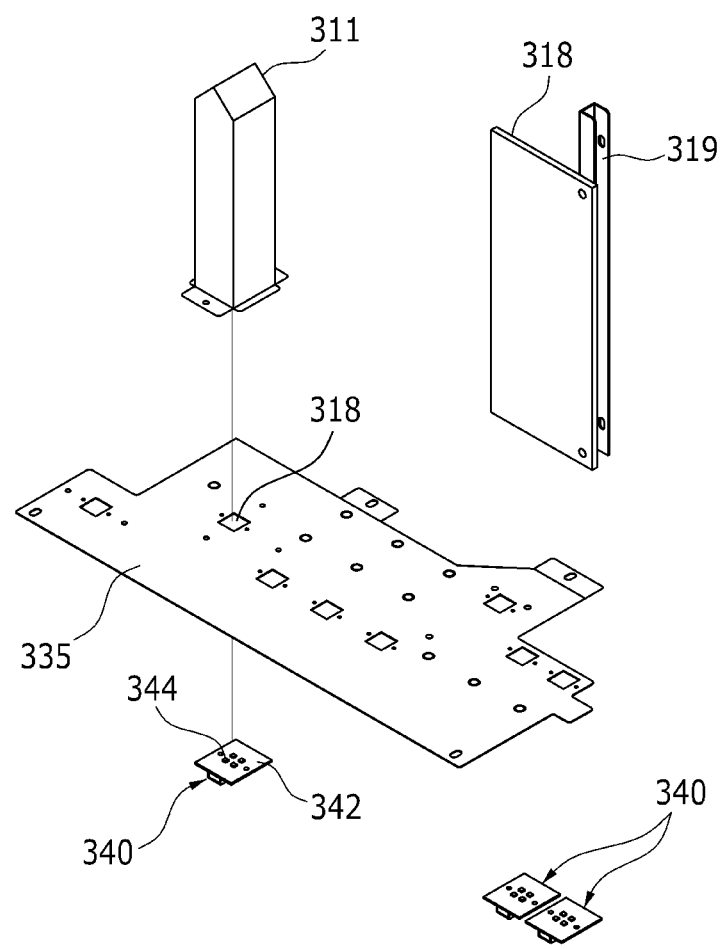
FIG. 24 is a schematic exploded perspective view of a base plate, background members, and lighting members.
Figure 25:
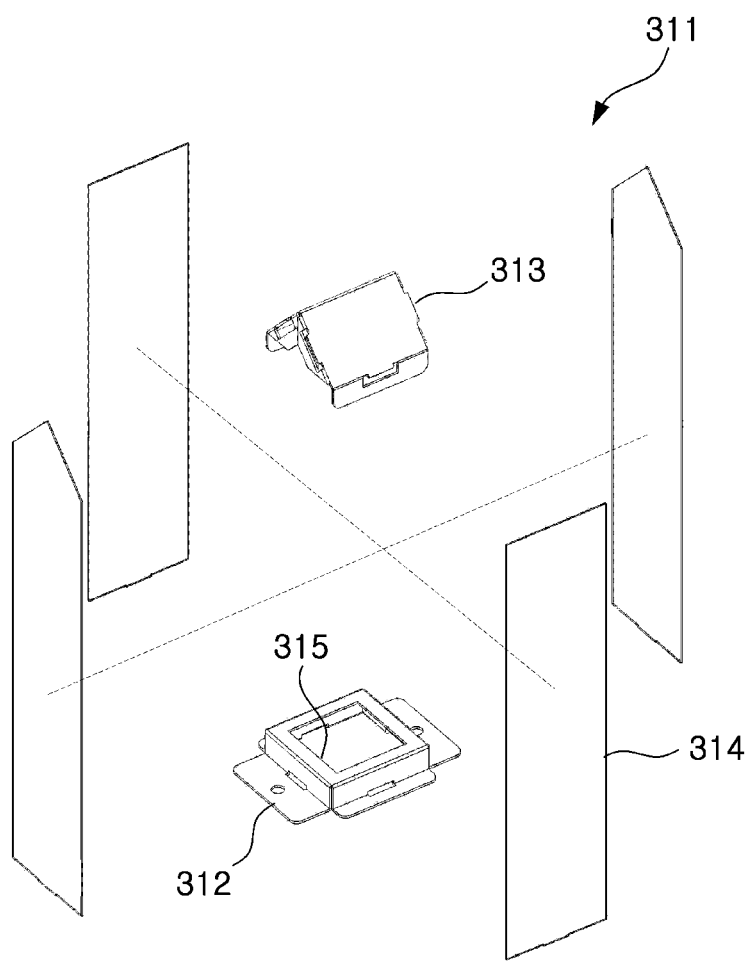
FIG. 25 is a schematic exploded perspective view of a miniature building.
Figure 26:
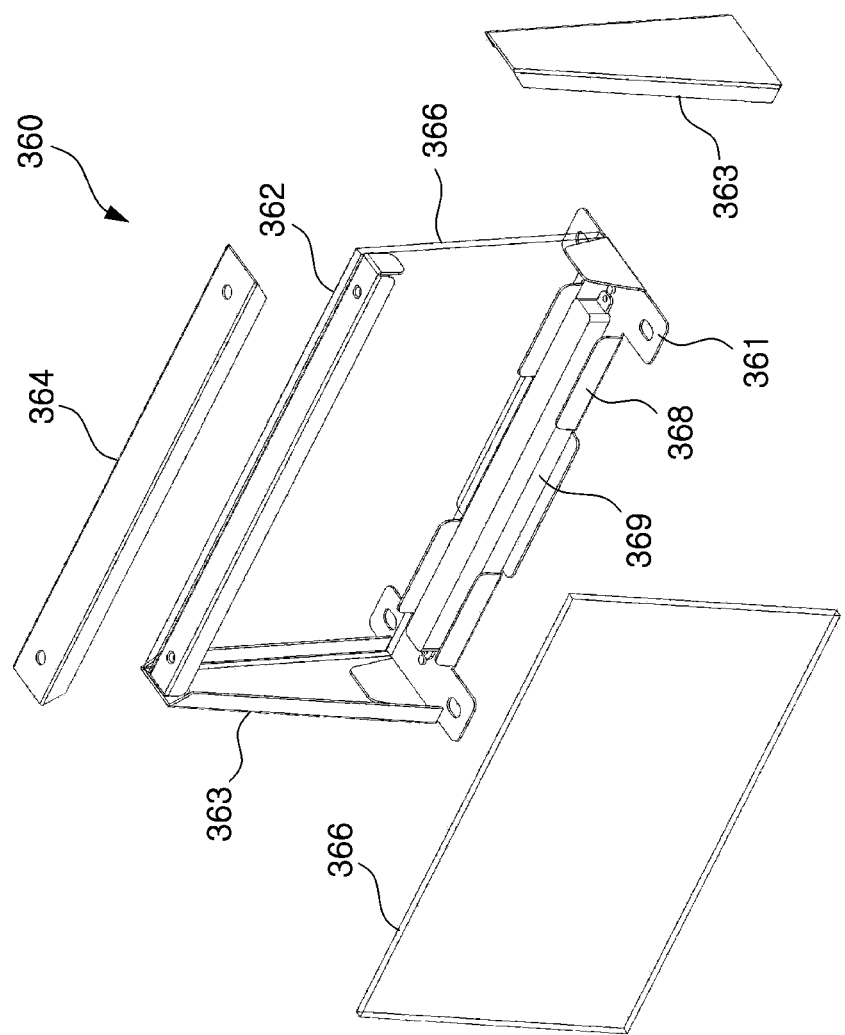
FIG. 26 is a schematic partially-exploded perspective view of a double-sided sign.
Figure 27:
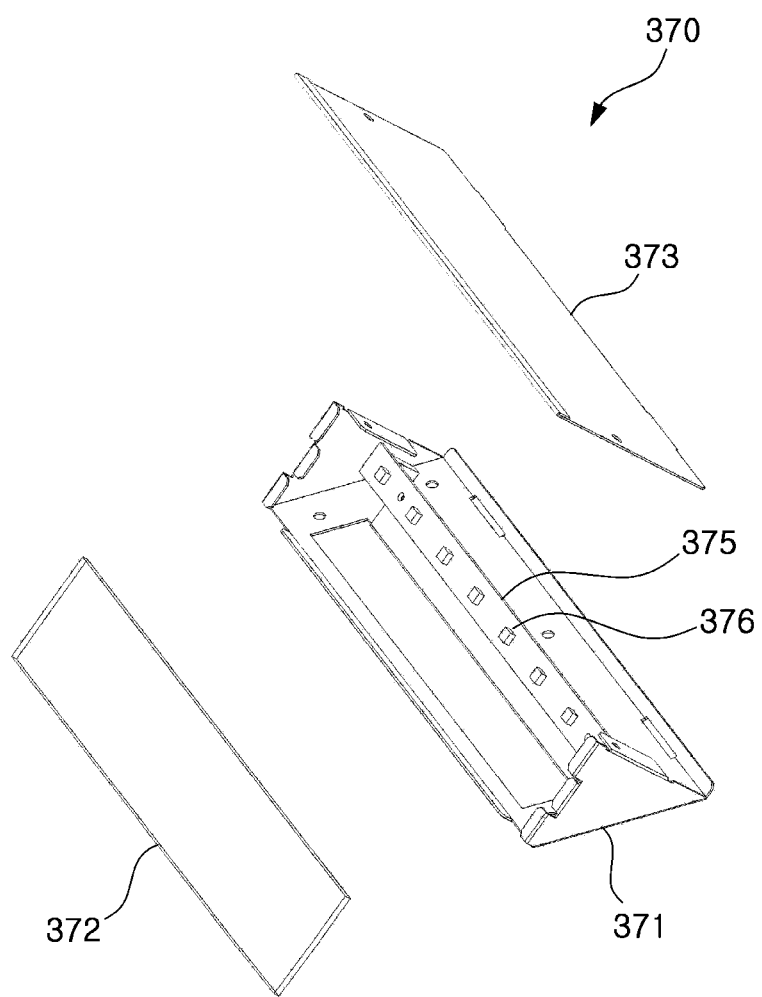
FIG. 27 is a schematic partially-exploded perspective view of a single-sided sign.

FIG. 19 is a schematic perspective view of the base support and the background assembly of the gaming machine shown in FIG. 16 to FIG. 18, FIG. 20 is a schematic top view of the base support and the background assembly, FIG. 21 is a schematic partially-exploded perspective view of a minor support of the base support and the background assembly, FIG. 22 is a schematic partially-exploded perspective view of base plates of the background assembly, FIG. 23 is a schematic perspective view of a base plate and background members thereon, FIG. 24 is a schematic exploded perspective view of a base plate, background members, and lighting members, FIG. 25 is a schematic exploded perspective view of a miniature building, FIG. 26 is a schematic partially-exploded perspective view of a double-sided sign, and FIG. 27 is a schematic partially-exploded perspective view of a single-sided sign.

Referring to FIG. 19 and FIG. 20, the base support 400 includes a main frame 410, a plurality of doors 420, a mirror support 430, and a plurality of casters 440, and a plurality of adjusters 450.

The main frame 410 may have a shape of a polygonal column, and each of the plurality of doors 420 are provided at a corresponding one of lateral surfaces of the main frame 410. FIG. 19 and FIG. 20 show a regular octagonal column having eight lateral surfaces as an example of the main frame 410, and eight doors 420 provided at respective lateral surfaces. The main frame 410 may have an internal space, and a control box 910 is disposed in the internal space of the main frame 410.

The mirror support 430 is disposed on the main frame 410, and may have a shape of a polygonal column, for example, a regular octagonal column like the main frame 410. Referring to FIG. 20, the mirror support 430 is smaller than the main frame 410, and the minor support 430 and the main frame 410 are arranged such that the vertices of the octagon of the minor support 430 are disposed near midpoints of edges of the octagon of the main frame 410. The height of the mirror support 430 and/or the height of the main frame 410 may be adjusted so that a player may enjoy playing a game with a comfortable posture and without noticing the downward screens of the primary display assembly 100.

Referring to FIG. 21, the minor support 430 has a center hole 432 and a plurality of supporting portions 434 around the center hole 432. The center hole 432 may have a shape of a square with concave corners, and the supporting portions may extend along edges of the square.

Referring to FIG. 19 and FIG. 20 again, the main frame 410 and the mirror support 430 have a plurality of holes near the vertices of the octagon of the main frame 410, and a speaker 920 is provided in each of the holes. Although FIG. 19 and FIG. 20 show that the number of the speakers 920 is four, the number of the speakers 920 is not limited thereto.

The casters 440 and the adjusters 450 are coupled to a bottom surface of the main frame 410. Each pair of one of the casters 440 and one of the adjusters 450 may be disposed near a vertex of the bottom surface of the main frame 410, and the pairs of the casters 440 and the adjusters 450 may be disposed near ends of a diagonal cross of the bottom surface.

The background assembly 300 is disposed on the mirror support 430, and include a plurality of background members 310 and 320 that may be seen through a partial mirror. The background members 310 and 320 may include first background members 310 disposed on at least one base plate 330 that is disposed on the minor support 430 and second background members 320 disposed directly on the mirror support. However, all of the background members 310 and 320 may be disposed on either the at least one base plate 330 or the mirror support 430. According to an embodiment of the present invention, the arrangement of the background members 310 and 320 and/or the at least one base plate 330 may be substantially the same in view of four orthogonal directions of a diagonal cross. However, the arrangements and structures of the background members 310 and 320 and/or the at least one base plate 330 may be designed freely without restrictions.

According to an embodiment of the present invention, referring to FIG. 21, the first background members 310, which are disposed on the at least one base plate 330, may include miniature buildings 311 and information boards 318, for example. The second background members 320, which are directly on the minor support 430, may include a plurality of signs including double-sided signs 360 and single-sided signs 370, for example.

Referring to FIG. 22, the at least one base plate 330 may include a center plate 331 and a plurality of, for example, four peripheral plates 335 disposed around the center plate 33. The center plate 331 has a plurality of lighting holes 333, and each of the peripheral plates 335 also has a plurality of lighting holes 337.

Referring to FIG. 23 and FIG. 24, a plurality of miniature buildings 311 may be disposed on each of the peripheral plates 335 and the center plate 331, and an information board 318 may be disposed on each of the peripheral plates 335. The miniature buildings 311 and the information board 318 may be aligned with the lighting holes 333 and 337 of the plates 331 and 335.

In addition, referring to FIG. 24, a plurality of lighting members 340 are disposed under respective lighting holes 333 and 337 of the plates 331 and 335. Each of the lighting members 340 may include a circuit board 342 and a plurality of discrete light sources, for example, light emitting diodes (LEDs) 344 disposed on the circuit board 342.

Referring to FIG. 25, a miniature building 311 may include a base 312, a top 313, and a plurality of lateral walls 314 coupled to the base 312 and the top 313. The base 312 is fixed to the plate 331 or 335 and has a lighting hole 315 at a center thereof. The lateral walls 314 may be translucent or transparent such that the light emitted from the LEDs 344 may pass through the lateral walls 314 of the miniature building 311 via a lighting hole 333 or 337 of the plate 331 or 335 and the lighting hole 315 of the base 312 of the miniature building 311. The lateral wall 314 may be covered with an oblique sheet having a plurality of windows through which the light from the LEDs 344 may pass such that the miniature building 311 may look like an actual building at night.

Referring to FIG. 24 again, the information board 318 may be fixed to a standing bracket 319 that may be fixed to the peripheral plate 335 or another member. The information board 318 may be used in displaying information about a player, for example, a game history of the player, which will be described later.

Referring to FIG. 26, a double-sided sign 360 may include a base bracket 361, a top bracket 362, a pair of side brackets 363, a top cover bracket 364, a pair of translucent plates 366, and a light source 369.

The light source 369 may include an LED strip in a lighting channel having a shape of a hollow rectangular bar. The light emitted by the light source may change between green and red. The base bracket 361 includes four upward portions 368, and the light source 369 is disposed in a space made by the four upward portions 368. The top bracket 362 and the upward portions 368 of the base bracket 361 are disposed between the translucent plates 366, which are disposed inclined. The top bracket 362 and upper edges of the translucent plates 366 are covered by the top cover bracket 364, and the top bracket 362 is coupled to the top cover bracket 364. In addition, lateral edges of the top bracket 362 and the translucent plates 366 are covered by the side brackets 363.

The light emitted from the light source 369 may passes through both the translucent plates 366. Referring to FIG. 21, the double-sided signs 360 are arranged such that the base bracket 361 and the top bracket 362 are aligned in a diagonal direction with respect to a center of the minor support 430. In addition, the double-sided signs 360 are from disposed near a midpoints of edges of the octagonal mirror support 430 such that the double-sided signs 360 may be seen by the players at the player terminals 600 disposed at both sides of the double-sided signs 360. In order to secure spaces occupied by the double-sided signs 360, the corners of the center hole 432 of the support 430 are made concave.

Referring to FIG. 27, a single-sided sign 370 may include a base bracket 371, a front plate 372, a rear cover 373, a circuit strip 375, and a plurality of light sources 376.

Each of the light sources 376 may include an LED, and the light sources 376 are coupled to a front surface of the circuit strip 375. The front plate 372 may be translucent or transparent, and faces the light sources 376 with being inclined. The rear cover 373 may be opaque and larger than the front plate 372 to extend beyond an upper edge of the front plate 372.

The light emitted from the light source 376 may passes through the translucent front plate 372 while the rear cover 373 may not allow the light to pass through. Referring to FIG. 21, the single-sided signs 370 are arranged such that the front plates 372 face an outward direction.

The double-sided signs 360 and the single-sided signs 370 may be arranged alternately along a circumference of the mirror support 430.

The above-described structure and arrangement of the background assembly 300 are only an example. The background assembly 300 may include anything that can be seen through a partial mirror arranged in any way.

A structure of the mirror assembly 200 of the gaming machine 1 is described in detail with reference to FIG. 28 and FIG. 29 as well as FIG. 16 to FIG. 18.

Figure 28:
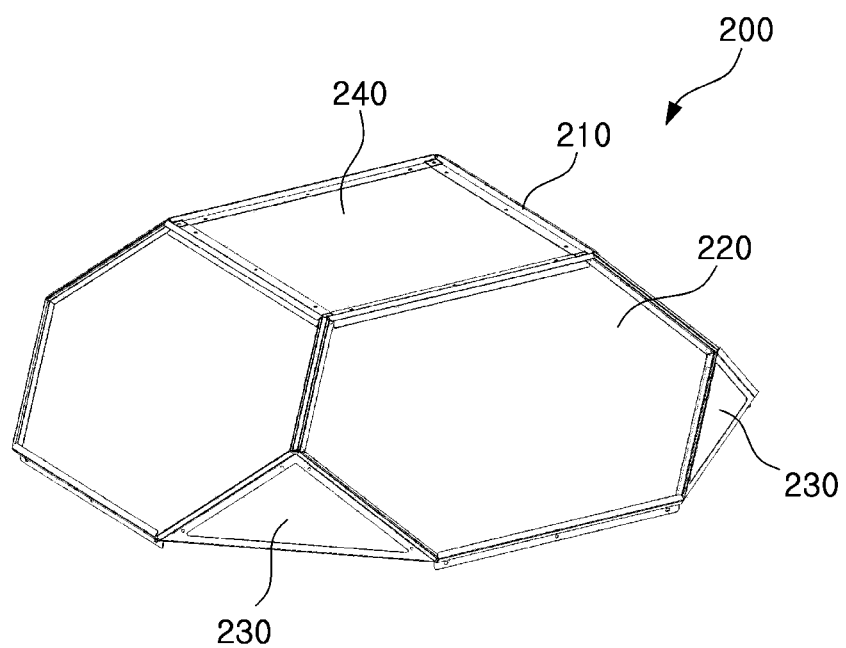
FIG. 28 is a schematic perspective view of the mirror assembly of the gaming machine shown in FIG. 16 to FIG. 18.

FIG. 28 is a schematic perspective view of the mirror assembly of the gaming machine shown in FIG. 16 to FIG. 18, and FIG. 29 is a schematic top view of the mirror assembly shown in FIG. 28.

Figure 29:
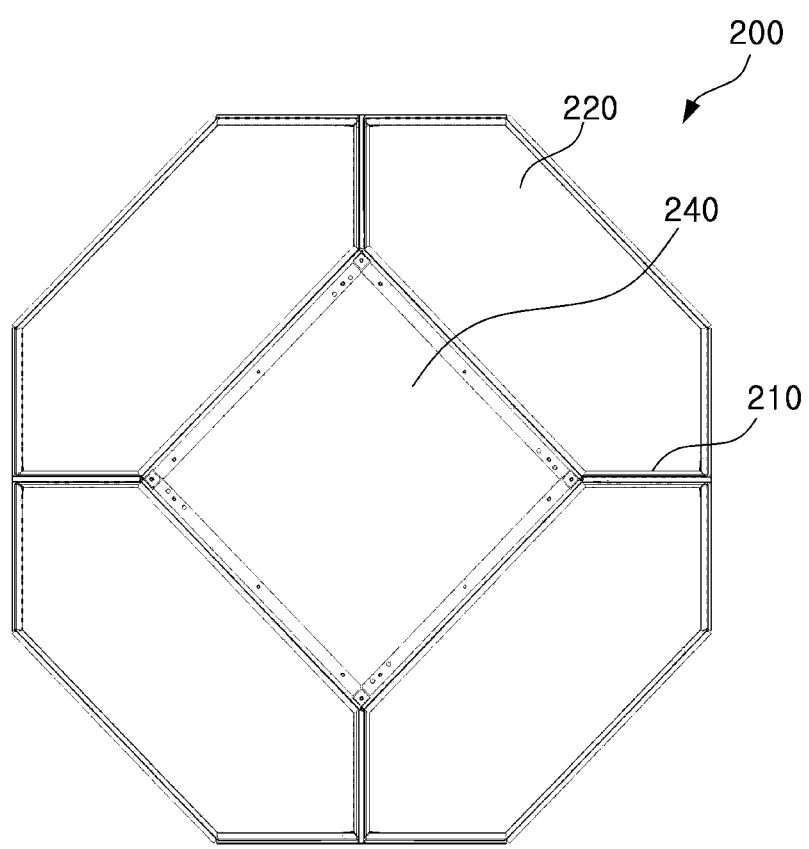
FIG. 29 is a schematic top view of the minor assembly shown in FIG. 28.

Referring to FIG. 28 and FIG. 29, the mirror assembly 200 has a shape of a polyhedral dome that includes a mirror frame 210 as edges thereof, and a plurality of partial mirrors (or beam splitters) 220, a plurality of cover plates 230, and a top plate 240 as facets thereof. Referring to FIG. 16 to FIG. 18, the mirror assembly 200 covers the background assembly 300, and is coupled to the mirror support 430 and supported by the mirror support 430.

The mirror frame 210 includes a plurality of brackets that are connected to each other and hold the partial mirrors 220. The top plate 240 is nearly square, the partial mirrors 220 are hexagonal, and the cover plates 230 are isosceles triangular. The number of the partial mirrors 220 and the number of the cover plates 230 may be four, respectively. Each of the partial mirrors 220 has an upper edge meeting an edge of the top plate 240, a pair of upper lateral edges meeting upper lateral edges of other partial mirrors 220, and a pair of lower lateral edges meeting oblique edges of the cover plates 230. An angle made by the upper edge of the partial mirror 220 with the edge of the top plate 240 may be about 45 degrees.

The partial mirrors 220 may partially transmit incident light and partially reflect incident light such that players at the player terminals 600 may see combined images including images from the primary display assembly 100 and images of the background assembly 300.

A structure of the primary display assembly 100 of the gaming machine 1 is described in detail with reference to FIG. 30 and FIG. 37 as well as FIG. 16 to FIG. 18.

Figure 30:
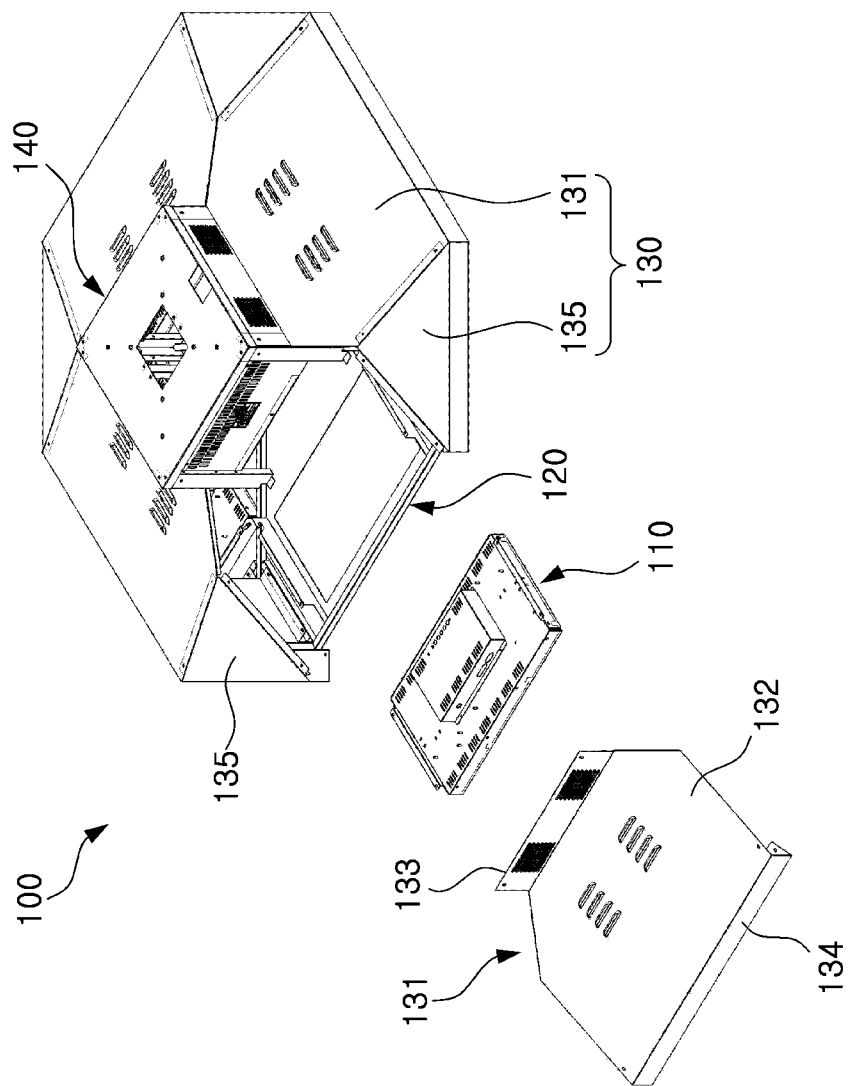
FIG. 30 is a schematic partially-exploded perspective view of the primary display assembly of the gaming machine shown in FIG. 16 to FIG. 18.
Figure 31:
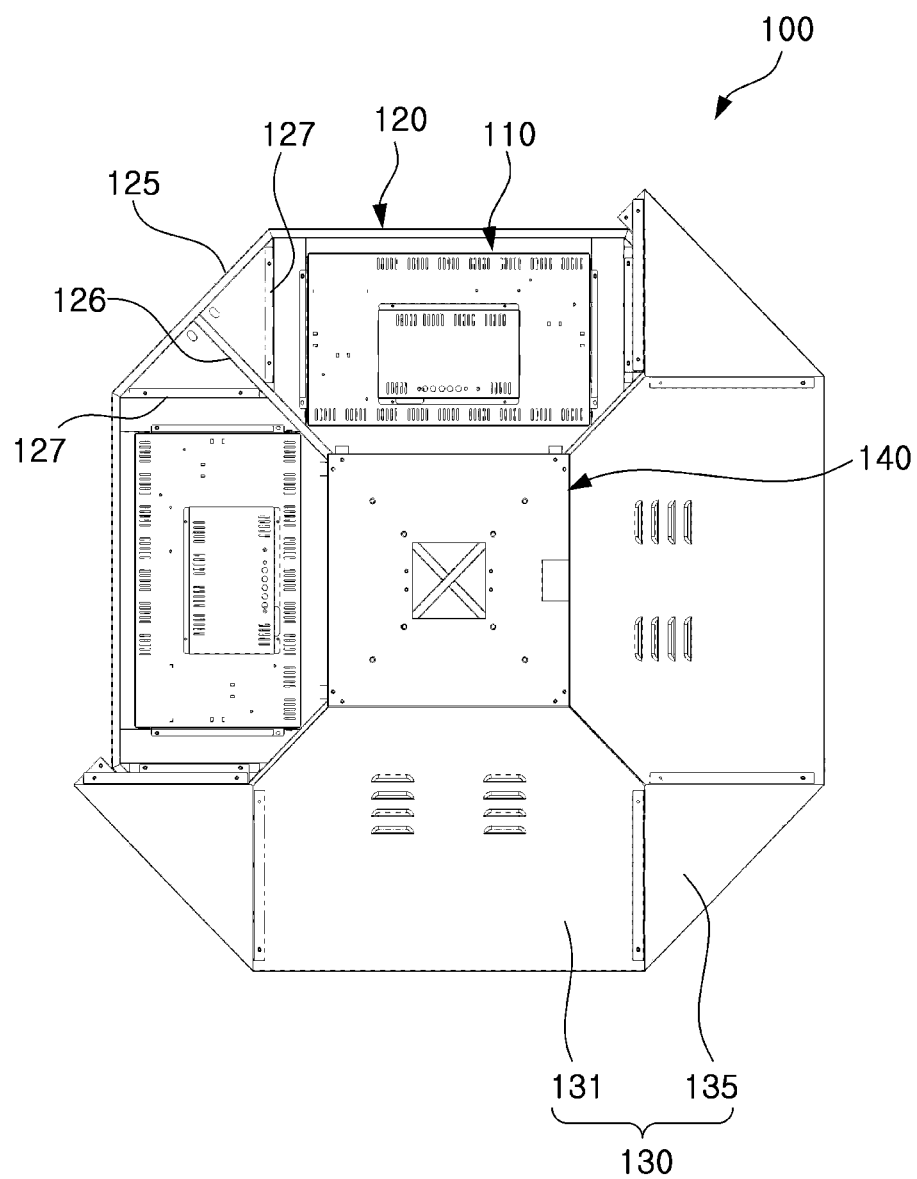
FIG. 31 is a schematic partially-exploded top view of the primary display assembly shown in FIG. 30.
Figure 32:
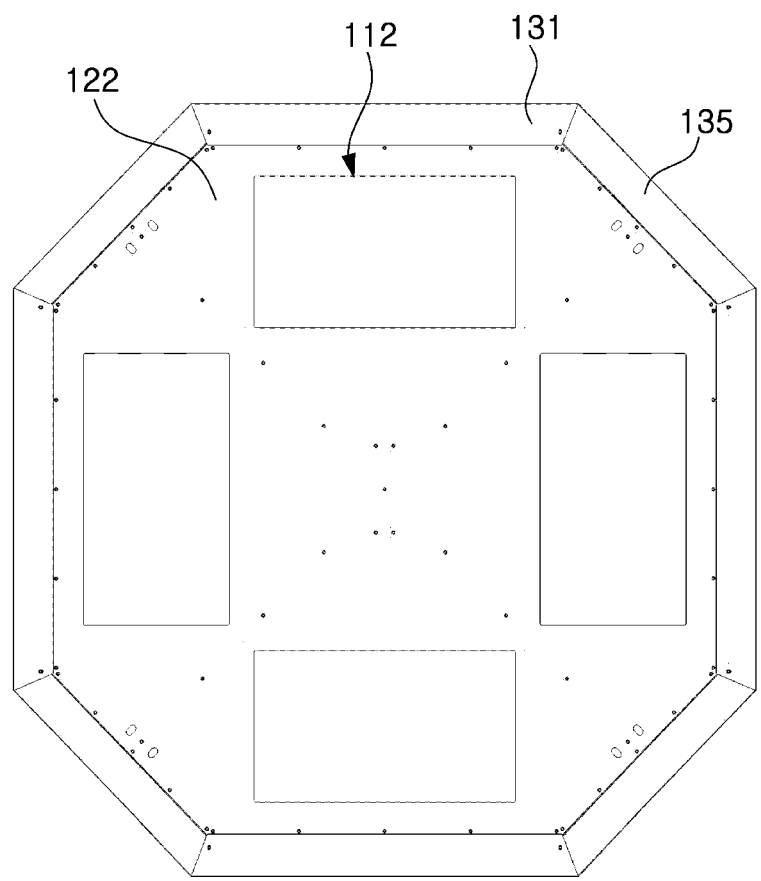
FIG. 32 is a schematic bottom view of the primary display assembly shown in FIG. 30.
Figure 33:
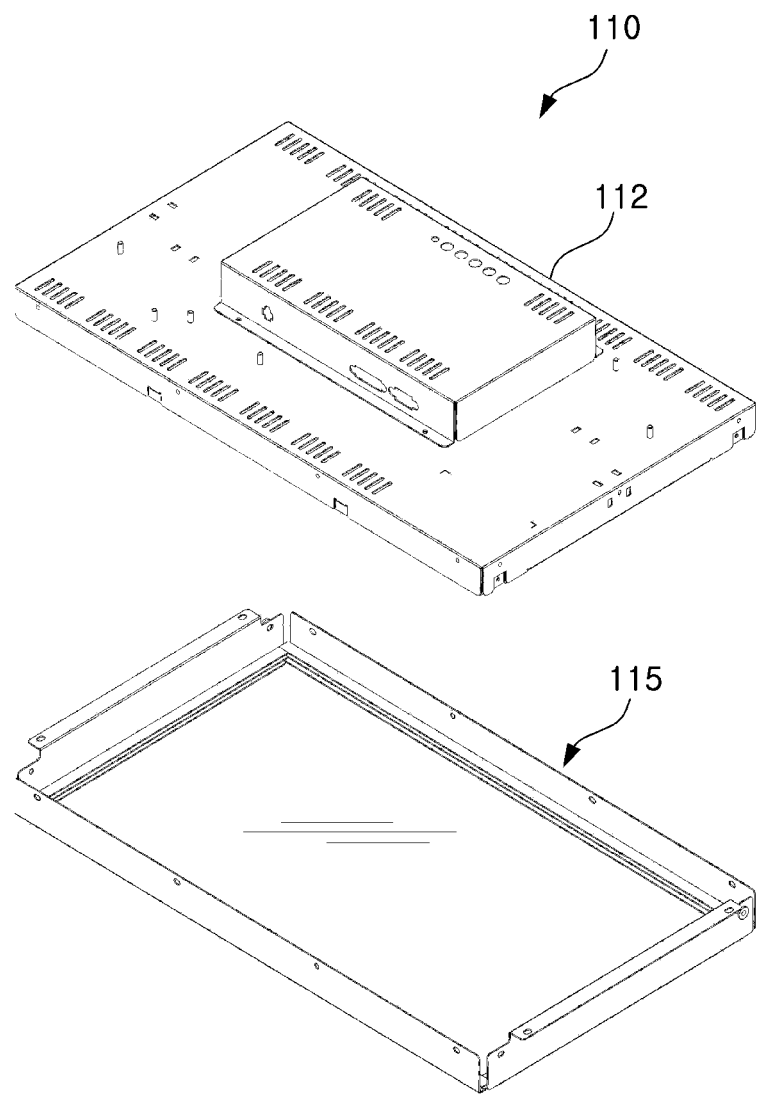
FIG. 33 is a schematic exploded perspective view of a display panel assembly of the primary display assembly shown in FIG. 30.
Figure 34:
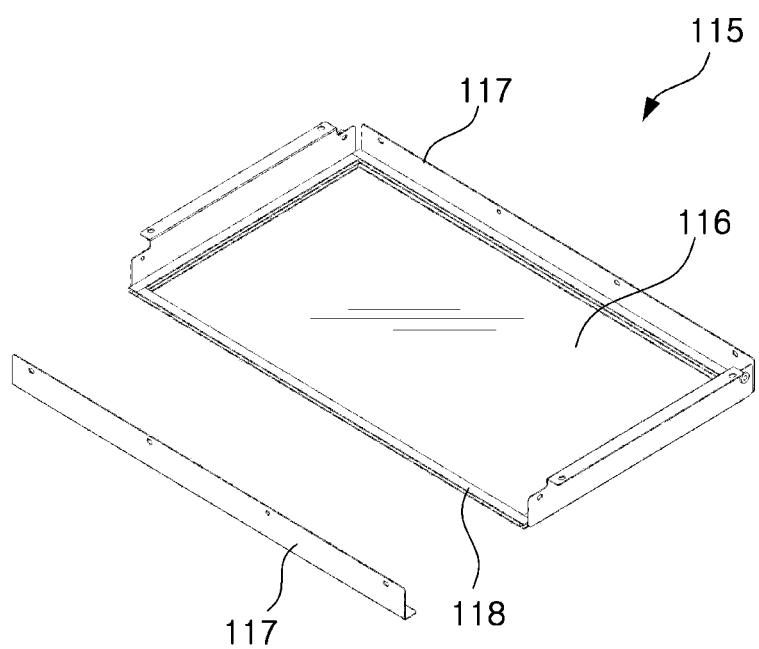
FIG. 34 is a schematic exploded perspective view of a protection of the display panel assembly shown in FIG. 33.
Figure 35:
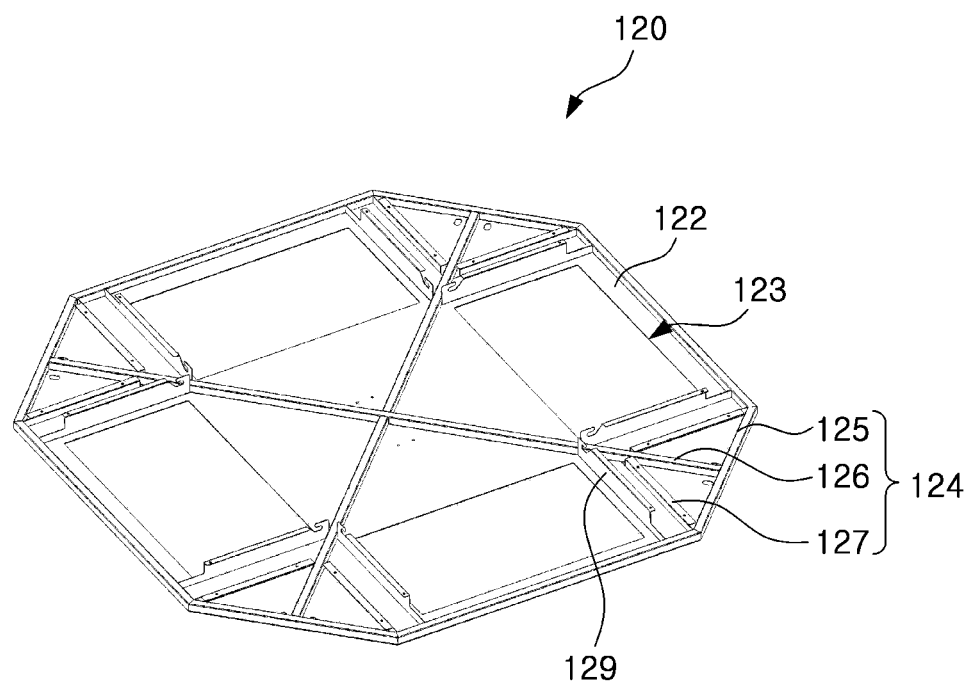
FIG. 35 is a schematic perspective view of a display support of the primary display assembly shown in FIG. 30.
Figure 36:
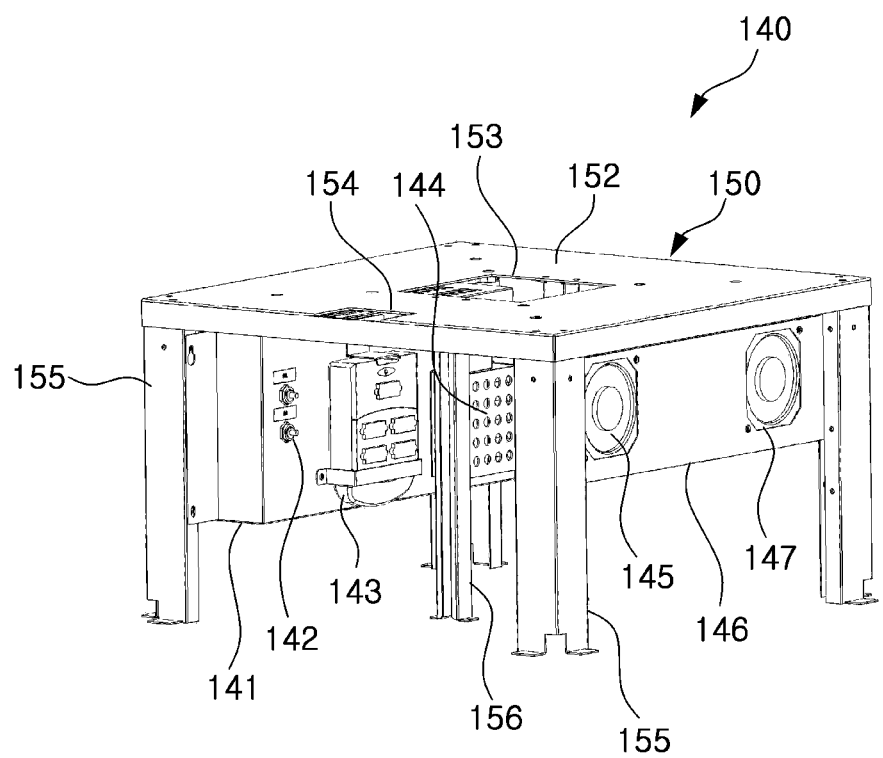
FIG. 36 is a schematic perspective view of an electric circuit assembly of the primary display assembly shown in FIG. 30.
Figure 37:
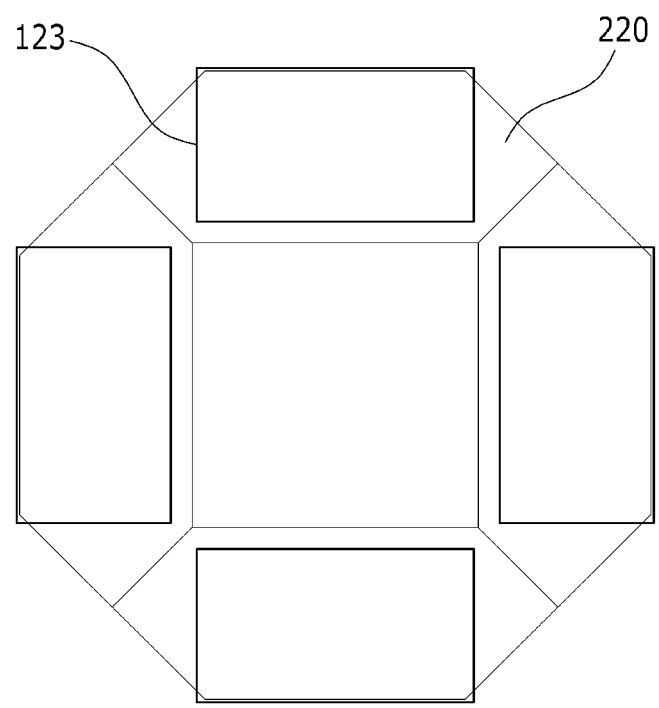
FIG. 37 is a top view of the minor assembly shown in FIG. 16 to FIG. 18 and openings in a base plate of the display support shown in FIG. 35.
Figure 38:
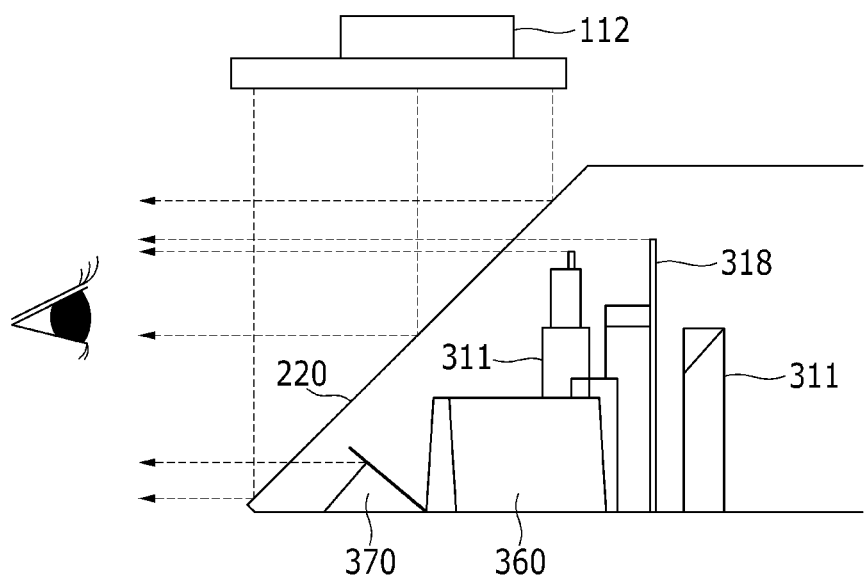
FIG. 38 and FIG. 39 illustrate operations of the gaming machine shown in FIG. 16 to FIG. 18.
Figure 39:
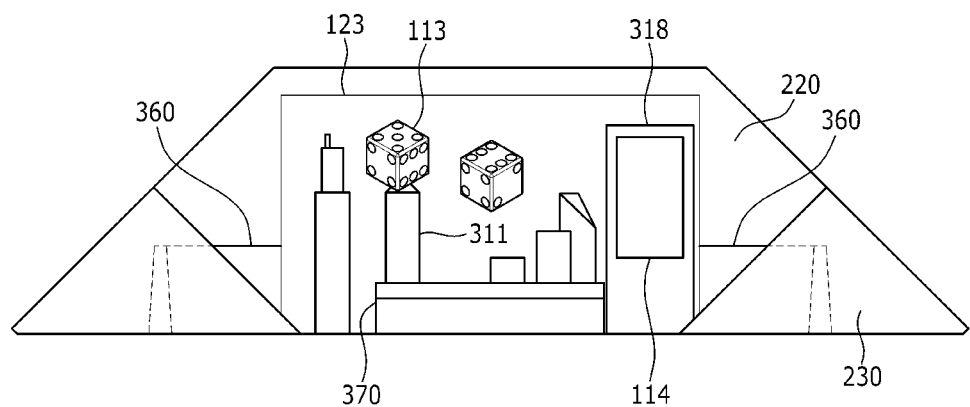

FIG. 30 is a schematic partially-exploded perspective view of the primary display assembly of the gaming machine shown in FIG. 16 to FIG. 18, FIG. 31 is a schematic partially-exploded top view of the primary display assembly shown in FIG. 30, FIG. 32 is a schematic bottom view of the primary display assembly shown in FIG. 30, FIG. 33 is a schematic exploded perspective view of a display panel assembly of the primary display assembly shown in FIG. 30, FIG. 34 is a schematic exploded perspective view of a protection of the display panel assembly shown in FIG. 33, FIG. 35 is a schematic perspective view of a display support of the primary display assembly shown in FIG. 30, FIG. 36 is a schematic perspective view of an electric circuit assembly of the primary display assembly shown in FIG. 30, FIG. 37 is a top view of the mirror assembly shown in FIG. 16 to FIG. 18 and openings in a base plate of the display support shown in FIG. 35, and FIG. 38 and FIG. 39 illustrate operations of the gaming machine shown in FIG. 16 to FIG. 18.

Referring to FIG. 30 to FIG. 32, the primary display assembly 100 includes a plurality of display panel assemblies 110, a display support 120, a panel cover assembly 130, and an electric circuit assembly 140. Referring to FIG. 16 to FIG. 18, the primary display assembly 100 is disposed over the mirror assembly 200 and supported by the post assemblies 500.

The electric circuit assembly 140 is disposed on a center of the display support 120, and four display panel assemblies 110 are disposed on the display support 120 such that the display support 120 supports the electric circuit assembly 140 and the display panel assemblies 110. The display panel assemblies 110 are arranged around the electric circuit assembly 140, and the display panel assemblies 110 may be electrically connected to the electric circuit assembly 140. The display panel assemblies 110 are covered with the panel cover assembly 130, and the panel cover assembly 130 is coupled to the display support 120. The primary display assembly 100 may further include a blocking member in front of the display panel assemblies 110 as described above with reference to FIG. 3.

Referring to FIG. 33 and FIG. 34, a display panel assembly 110 includes a rectangular display panel 112 and a protection 115 receiving and protecting the display panel 112. The display panel assembly 110 may further include a filter disposed on a screen of the display panel 112 as described above with reference to FIG. 4 to FIG. 7B. The protection 115 includes a rectangular transparent plate 116 and four side brackets 117. The transparent plate 116 may include glass or acrylic resin. The side brackets 117 define a cuboid space receiving the transparent plate 116 and the display panel 112 in sequence, and the display panel 112 is disposed on the transparent plate 116 such that a screen of the display panel 112 faces the transparent plate 116. A plurality of rubber strips 118 are disposed between the transparent plate 116 and the side brackets 117 and between the transparent plate 116 and the display panel 112 to protect the transparent plate 116 and the display panel 112.

Referring to FIG. 35, the display support 120 includes a base plate 122, a frame 124, and a plurality of partition brackets 129.

The base plate 122 is octagonal, and has two pairs of long edges and two pairs of short edges. The long edges in each pair of long edges are substantially parallel to each other, and two pairs of long edges are substantially perpendicular to each other. Similarly, the short edges in each pair of short edges are substantially parallel to each other, and two pairs of short edges are substantially perpendicular to each other.

The base plate 122 has four rectangular openings 123 near its long edges. A long edge of the openings 123 is substantially parallel to a corresponding long edge of the base plate 122. The partition brackets 129 are fixed to the base plate 122 near short edges of the openings 123, and extend substantially parallel to the short edges of the openings 123. Each of the display panel assemblies 110 is disposed between a pair of the partition brackets 129 such that the screens of the display panels 112 may be exposed through the openings 123.

The frame 124 is fixed to the base plate 122, and includes a circumferential portion 125, a cross portion 126, and cover fixing portions 127. Each of the portions 125, 126 and 127 may include at least one rectangular hollow bar. The circumferential portion 125 extends along a circumference of the base plate 122. The cross portion 126 crosses the base plate 122 in a cross, and runs between the openings 123. The cover fixing portions 127 extend substantially parallel to partition brackets 129 to meet the circumferential portion 125 and the cross portion 126, and are disposed outer than the partition brackets 129 with respect to the openings 123.

Referring to FIG. 36, the electric circuit assembly 140 includes a plurality of circuits including a first power supply (not shown) contained in a power supply box 141, a pair of circuit breakers 142, a VGA splitter 143, a second power supply 144, and a plurality of fans 145. The fans 145 are fixed on a fan supporting bracket 146 having a pair of openings 147 exposing the fans 145.

The electric circuit assembly 140 further includes a support table 150 for fixing and supporting the circuits 141-145. The support table 150 includes a square table top 152 and a plurality of legs 154 coupled to the table top 152 near the corners of the table top 152. The support table 150 further includes a pair of supporting posts 156 coupled to the table top 152 near the center of the table top 152. The legs 154 and the supporting posts 156 may be coupled to the base plate 122 of the display support 122. The table top 152 has a center hole 153 and a side hole 154. The power supply box 141 may be fixed to two adjacent legs 155 of the support table 150, and the fan supporting bracket 146 may be fixed to two other adjacent legs 155 of the support table 150. The circuit breakers 142 passes through a wall of the power supply box 141, and are fixed to the wall. The VGA splitter 143 and the second power supply 144 are coupled to the wall of the power supply box 141.

Referring to FIG. 30 to FIG. 32 again, the panel cover assembly 130 includes a plurality of panel covers 131 and a plurality of fixing covers 135. The fixing covers 135 are coupled to the cover fixing portions 127 of the frame 124 in the display support 120, and the panel covers 131 are coupled to the fixing covers 135. A fixing cover 135 is aligned with an area surrounded by two adjacent cover fixing portions 127 and the circumferential portion 125 of the frame 120. A panel cover 131 is aligned with an area surrounded by two cover fixing portions 127 interposing a panel assembly 110, the circumferential portion 125 of the frame 120, the cross portion 126, and a lateral surface of the electric circuit assembly 140.

A panel cover 131 includes a horizontal portion 132 covering a display panel 112, a vertical portion 133 covering a lateral surface of the electric circuit assembly 140, and a bracket portion 134. The vertical portion 133 is connected to an upper edge of the horizontal portion 132, and the bracket portion 134 is connected to a lower edge of the horizontal portion 132. The horizontal portion 132 covers a rear surface of a display panel 112 disposed between the partition brackets 129, and the horizontal portion 132 has a plurality of heat dissipation holes for dissipating the heat released by the display panel 112. The vertical portion 133 covers a lateral surface of the electric circuit assembly 140, and the vertical portion 133 has a plurality of heat dissipation holes for dissipating the heat released by the electric circuit assembly 140.

Referring to FIG. 37 to FIG. 39 as well as FIG. 16 to FIG. 18, each of the openings 123 of the base plate 122 exposing a screen of the display panels 112 is aligned with a partial minor 220 of the minor assembly 200 such that images 113 and 114 on the screen may be reflected by the partial minor 220 to be shown to a player. In addition, the images of the background members 310 and 320 including the miniature buildings 311, the information board 318, the single-sided sign 370, and the double-sided sign 360 illuminated by the light sources 344, 369 and 376 may pass through the partial mirror 220 to overlap the images 113 and 114. The images 113 and 114 may include an information image 114 about a gaming history, and the information image 114 may be aligned with the information board 318 as if the information image 114 were disposed on the information board 318.

A structure of the post assembly 500 of the gaming machine 1 is described in detail with reference to FIG. 40 to FIG. 42 as well as FIG. 16.

Figure 40:
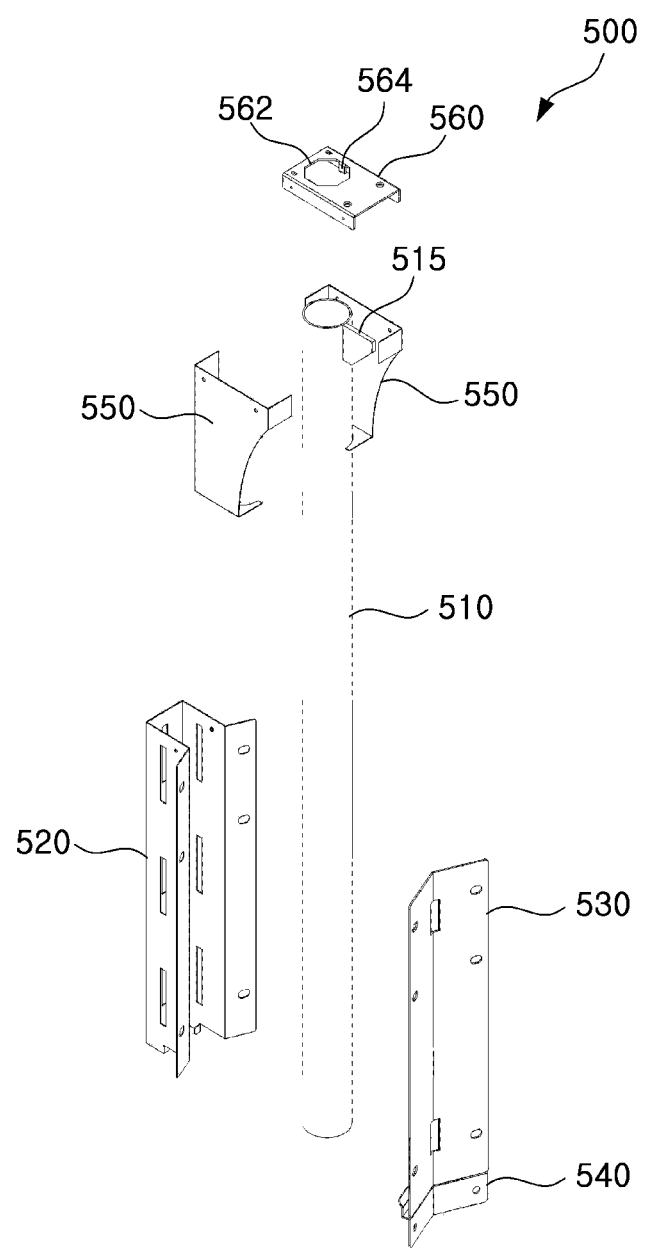
FIG. 40 is a schematic exploded perspective view of the post assembly of the gaming machine shown in FIG. 16 to FIG. 18.
Figure 41:
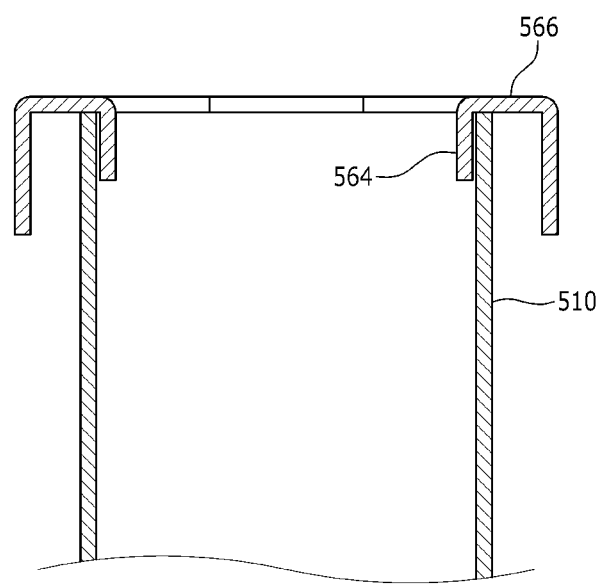
FIG. 41 is a schematic sectional view of a post and a top bracket in the post assembly shown in FIG. 40.
Figure 42:
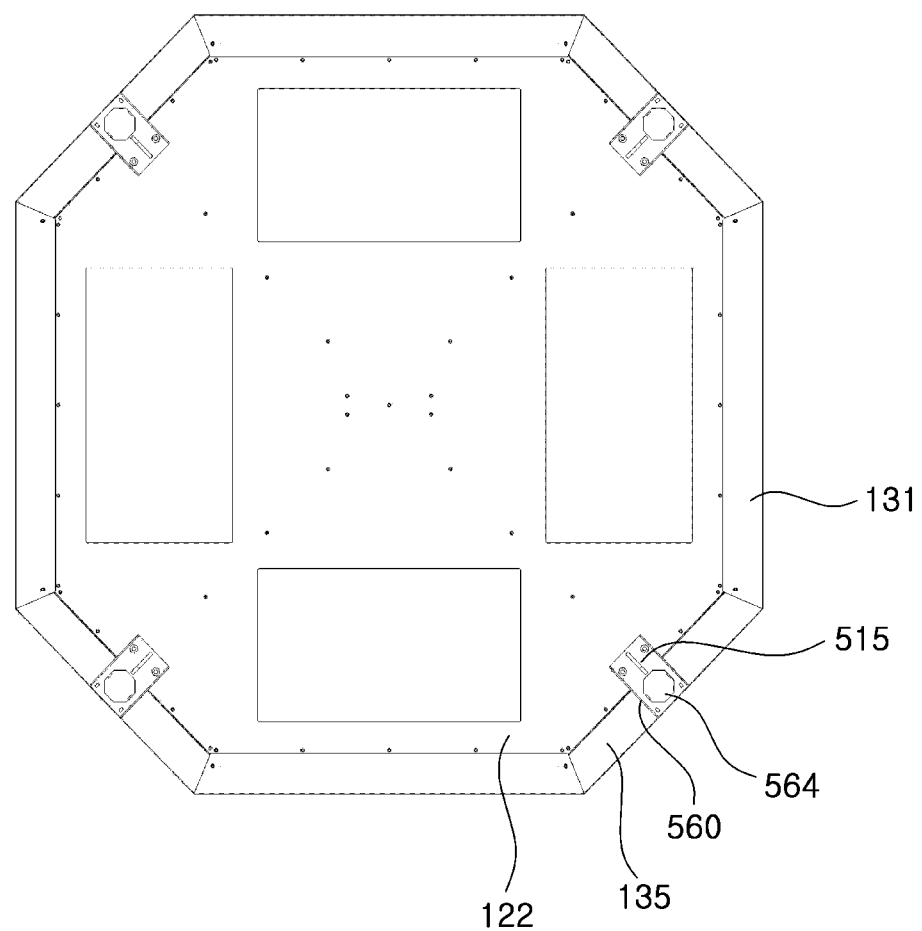
FIG. 42 is a schematic bottom view of portions of the post assembly and the primary display assembly.

FIG. 40 is a schematic exploded perspective view of the post assembly of the gaming machine shown in FIG. 16 to FIG. 18, FIG. 41 is a schematic sectional view of a post and a top bracket in the post assembly shown in FIG. 40, and FIG. 42 is a schematic bottom view of portions of the post assembly and the primary display assembly.

Referring to FIG. 40 and FIG. 41, a post assembly 500 includes a post 510, an assistant piece 515, a supporting bracket 520, a fixing bracket 530, a post stopper 540, a pair of cover brackets 550, and a top bracket 560 as facets thereof. Referring to FIG. 16, the post assembly 500 supports the display assembly 100 and is fixed to the base support 400.

The post 510 has a shape of a hollow cylinder, and the assistant piece 515 protrudes outward from the outer circumferential surface of the post 510. The assistant piece 515 is disposed at the top of the post 510 and may have a top surface substantially parallel to a top surface of the post 510 such that the assistant piece 515 may help the post 510 supporting the top bracket 560 and the display assembly 100.

The post 510 is inserted into the supporting bracket 520, and fastened by the fixing bracket 530 that are fixed to the main frame 410 of the base support 400. The post stopper 540 is fixed to the main frame 410, and disposed under the fixing bracket 530 so that the supporting bracket 530 may not slip down.

The top bracket 560 has a hole 562 and includes a pair of vertical protrusions 564 extending downward from a circumference of the hole 562. The vertical protrusions 564 are disposed opposite in a diagonal direction of the hole 562. The top bracket 560 is coupled with the post 510 such that the vertical protrusions 564 are substantially in contact with an inner circumference of the posit 510. In addition, the top bracket 560 is coupled to the cover brackets 550 that covers upper portion of the post 510 including the assistant piece 515. The top bracket 560 is coupled with the base plate 122 and the fixing cover 135 of the primary display assembly 100. In this way, the primary display assembly 100 is supported by the post assembly 500 that is coupled to the base support 400.

A structure of the player terminal 600 of the gaming machine 1 is described in detail with reference to FIG. 43 as well as FIG. 16.

Figure 43:
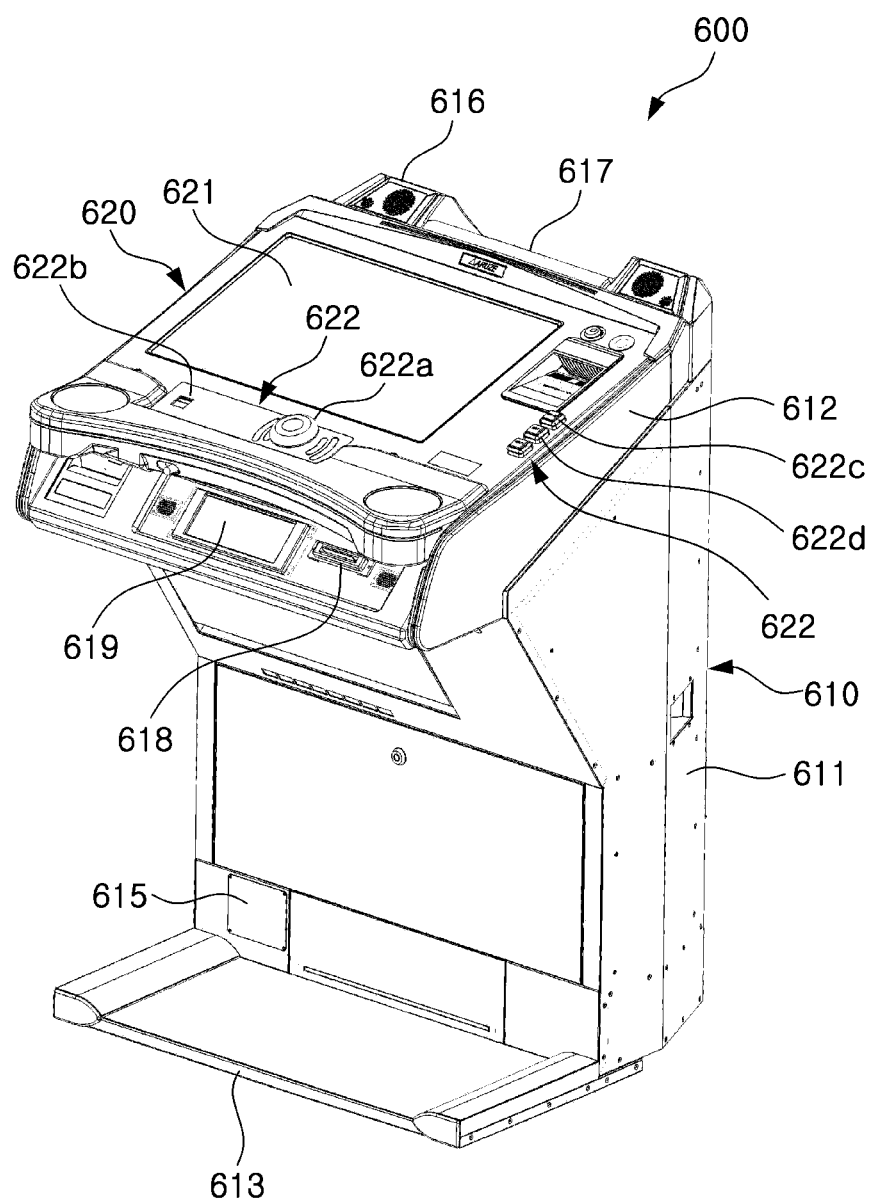
FIG. 43 is a schematic perspective view of the player terminal of the gaming machine shown in FIG. 16 to FIG. 18.

FIG. 43 is a schematic perspective view of the player terminal of the gaming machine shown in FIG. 16 to FIG. 18.

The player terminal 600 includes a cabinet 610 and a top door 620 disposed on the cabinet 610.

The cabinet 610 may include electrical circuits therein, and includes a main body 611, a top body 612 disposed between the main body and the top door 620, and a support plate 613 disposed under the main body 611. According to an embodiment of the present invention, the main body 611 may include a main controller therein, and the top body 612 may include a relay unit and a sensor therein.

The main body 611 includes a foot lamp 615 on a front surface thereof near the support plate 613, and the foot lamp 615 illuminates the support plate 613 and a player's feet sitting in front of the player terminal 600. When there is no player at the player terminal 600, the foot lamp 615 may turn off. The main body 611 further includes a plurality of speakers 616 and a head lamp 617 that are disposed behind the top door 620 in a detachable manner.

The top body 612 includes a card slot 618 and an information display 619 on a front surface thereof. The card slot 618 is provided for a player to insert a player card that may store information about the player, for example, a player ID and a gaming history of the player. The player card inserted in the card slot 618 may be read by a card reader (not shown). The information stored in the player card may be recorded by a player tracking system (PTS), and may be displayed on the information display 619.

The top door 620 includes a terminal display 621, an operation unit 622, a coin entry 623, and a bill entry 624.

The terminal display 621 displays images associated with a game, and occupy a large area of the top door 620. The terminal display 621 may include a touch screen for player's input.

The operation unit 622 may be used for a player to play a game, and includes a plurality of buttons 622a-622d, for example, a play button (or a shake/shooter button) 622a, a select button 622b, a payout button 622c, and a help button. The play button 622a and the select button 622b are disposed below the terminal display 621, and the payout button 622c and the help button 622d are disposed at a side of the terminal display 621.

The play button 622a may cause, when pushed, an action of a game. For example, in craps or sic bo, a player may press the play button 622a to make virtual dice roll, the virtual dice shown on the partial mirror 220. The select button 302 is used in selecting bet or in confirming an input of a player. The payout button 303 may be provided for a player who wishes to finish a game and to be paid out for remaining credits. The help button 304 may be used for a player to get information about a game.

The player terminal 600 may further include a hopper unit (not shown) containing coins or medals and discharging medals or coins for payout, etc.

An electrical circuit configuration of the gaming machine 1 shown in FIG. 16 to FIG. 18 is described in detail with reference to FIG. 44 as well as FIG. 16 to FIG. 18.

Figure 44:
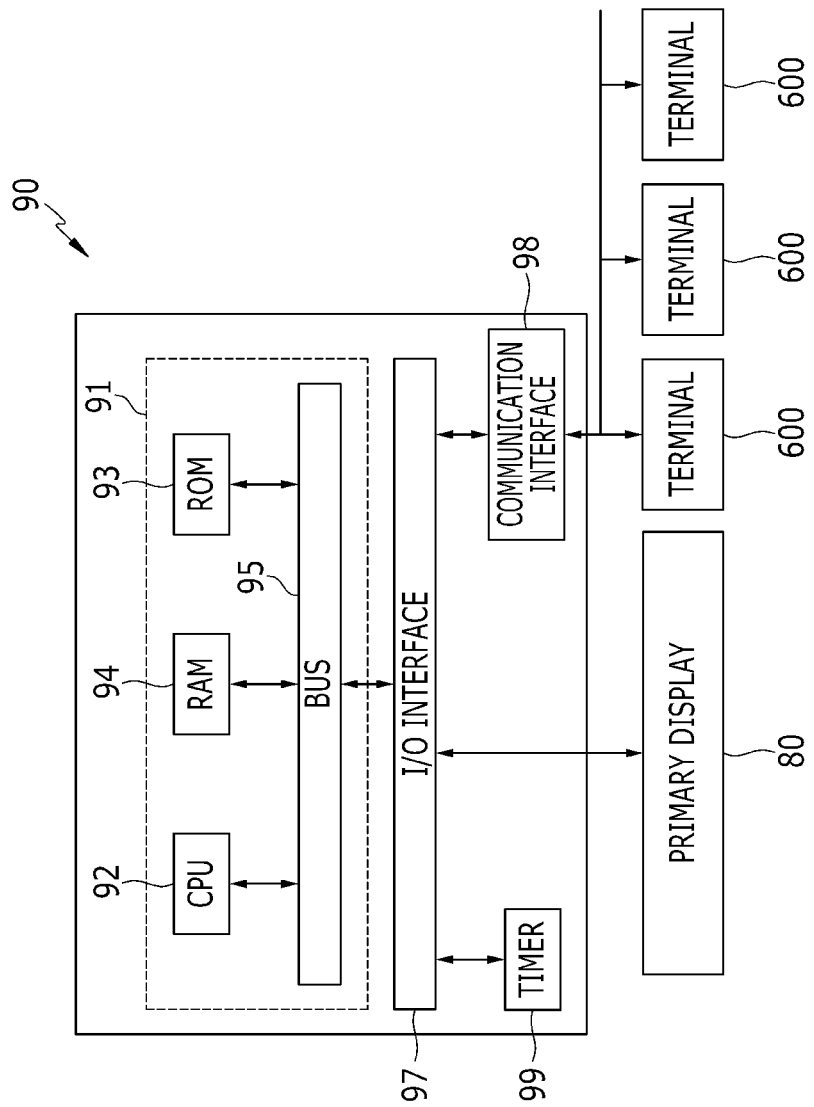
FIG. 44 is a block diagram of a circuit configuration of the game machine shown in FIG. 16 to FIG. 18.

FIG. 44 is a block diagram of a circuit configuration of the game machine shown in FIG. 16 to FIG. 18.

The gaming machine 1 includes a main controller 90, a primary display 80, and a plurality of player terminals 600. The primary displays 80 correspond to the display panels 112 of the display panel assembly 110, and the primary display 80 and the player terminals 600 are connected to the main controller 90.

The main controller 90 may execute a game and may control other parts of the gaming machine 1. The main controller 90 includes a microcomputer 91, an I/O interface 97, a communication interface 98, and a timer 99, and may be included in the control box 910 shown in FIG. 19.

The microcomputer 91 includes a CPU 92, a ROM 93, a RAM 94, and a bus 95. Data communication between the CPU 92, the ROM 93, and the RAM 94 is performed via the bus 95. The CPU 92 is connected to the primary display 80, the communication interface 98, and the timer 99 via the I/O interface 97.

The ROM 93 may be configured to store programs used in executing a game and controlling the primary display 10 and the player terminals 600. The ROM may further store a payment table, for example.

The RAM 94 may be configured to temporarily store various data used by the CPU 92. According to an embodiment of the present invention, the RAM 94 may store bet information from the player terminals 600 and intermediate or resultant data related to a game processing executed by the CPU 92.

The CPU 92 executes a game using the programs and the data stored in the ROM 93 and the RAM 94. In addition, the CPU 92 controls the primary display 80 via the communication interface 98, and performs bidirectional data communication with the player terminals 600, and controls the player terminals 600 via the communication interface 98. According to an embodiment of the present invention, the CPU 92 sets a bet time with the timer 99 and receives bet information from the player terminals 600. The CPU 92 executes a game round when the CPU 92 receives bet information from all the player terminals 600. The CPU 92 performs win determination and win prize determination based upon the win determination and the bet information from the player terminals 600.

An electrical circuit configuration of the player terminal 600 of the gaming machine 1 shown in FIG. 16 and FIG. 43 is described in detail with reference to FIG. 45 as well as FIG. 16 to FIG. 18.

Figure 45:
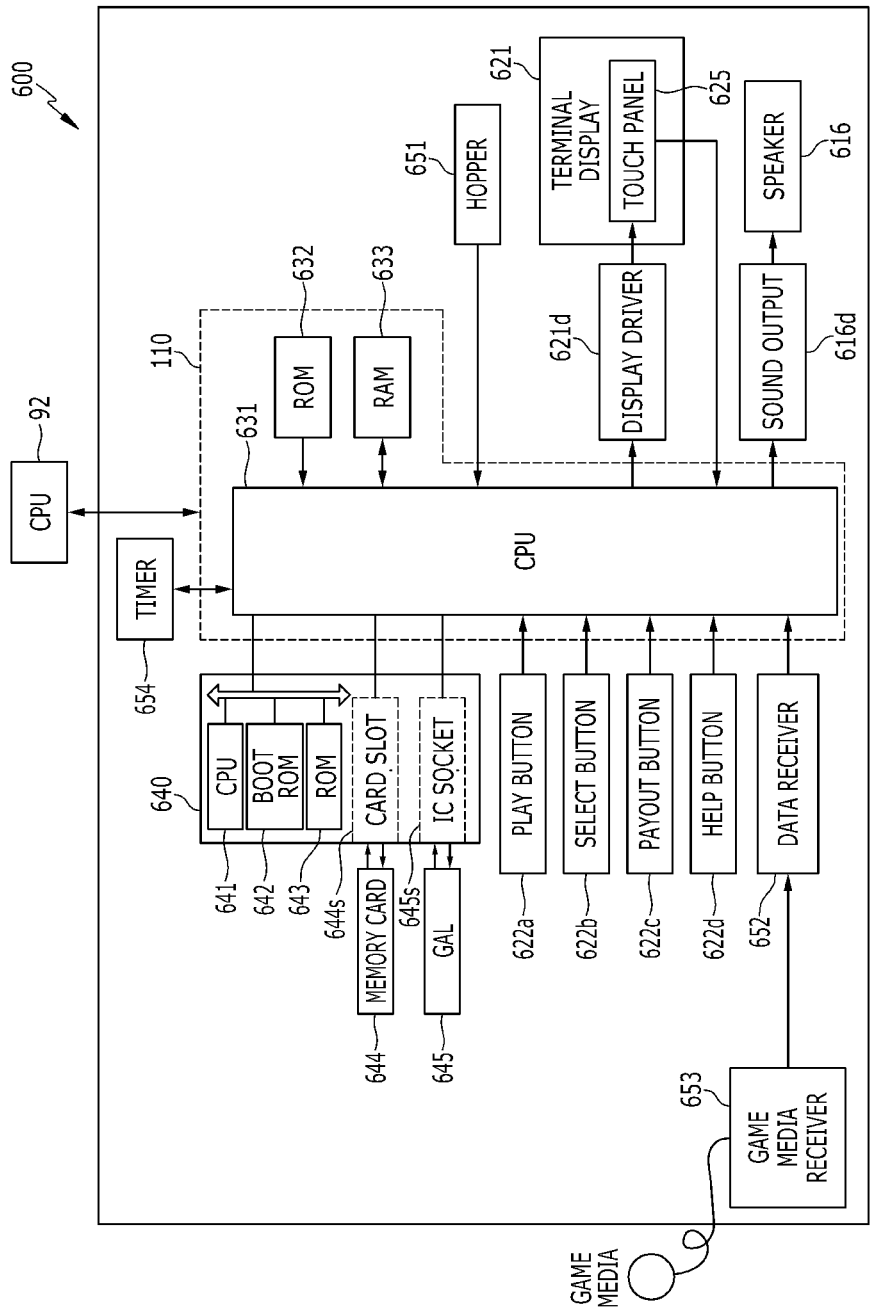
FIG. 45 is a block diagram of a circuit configuration of the player terminal of the game machine shown in FIG. 16 and FIG. 43.

FIG. 45 is a block diagram of a circuit configuration of the player terminal of the game machine shown in FIG. 16 and FIG. 43.

Referring to FIG. 45, a player terminal 600 includes a terminal controller 630, a gaming board 640, and a plurality of peripheral devices.

The peripheral devices may include output units including a terminal display 621, a display driver 621d for driving the terminal display 621, a speaker 616, a sound output circuit 616d for controlling the speaker 616 to output sounds, and a hopper 651, for example. The hopper 651 stores and discharges gaming media.

The peripheral devices may further include input units including a plurality of buttons 622a-622d, a data receiver 652, a game media receiver 653, and a touch panel 625. The plurality of buttons 622a-622d includes a play button 622a, a select button 622b, a payout button 622c, and a help button 622d, and the touch panel 625 may be integrated into the terminal display 621. The game media receiver 653 receives game media and generates and transmits a credit signal to the data receiver 652, and the data receiver 652 transmits the credit signal or a corresponding signal to the CPU 631.

The peripheral devices may further include a timer 654. Some of the peripheral devices such as the terminal display 621, the speaker 616, and the buttons 622a-622d are also shown in FIG. 43.

The terminal controller 630 includes a CPU 631, a ROM 632, and a RAM 633, and is connected to the CPU 92 of the main controller 90.

The ROM 632 may store programs for achieving basic functions of the player terminal 600, various kinds of programs required for controlling the player terminal 600, and a data table or the like. The RAM 633 may temporarily store various data used by the CPU 631.

The CPU 631 may be connected to the CPU 92 of the main controller 90 and the input units 622a-622d, 652 and 625, and may perform various operations in response to commands from the control of the CPU 92 of the main controller 90 or inputs from the input units 622a-622d, 651, 652 and 625.

According to an embodiment of the present invention, the CPU 631 receives a command signal from the CPU 92 of the main controller 90, performs various processes with the data or the programs stored in the ROM 632 and the RAM 633, and controls peripheral devices of the player terminal 600 base on a result of the processes. In addition, the CPU 631 conducts proper operations in response to the inputs from the input units 622a-622d, 651, 652 and 625, executes various processes with the data or the programs stored in the ROM 632 and the RAM 633, and then, transmits results of the processes to the CPU 92 of the main controller 90.

The display driver 621d may include a program ROM, an image ROM, an image control CPU, a work RAM, a VDP (video display processor), and a video RAM, for example. The program ROM may store programs for image control, related to display in the terminal display 621 or various kinds of selection tables. The image ROM may store dot data or the like for forming an image to be displayed on the terminal display 621, for example. The image control CPU may select an image to be displayed on the terminal display 621 among the dot data stored in the image ROM in advance based upon the parameter set by the CPU 631. The work RAM may be used as a temporary storage when the image control CPU executes an image control program. The VDP forms an image according to the contents of display determined by the image control CPU and then outputs the formed image to the terminal display 621. The video RAM is configured as temporary storage means when the VDP forms an image.

The touch panel 625 is mounted onto a front face of the terminal display 621, detects a player's touch input thereon, and transmits information of the touch input to the CPU 631. According to an embodiment of the present invention, RAM 633 may store the player's bet information based upon the information when the touch input is related to bet. The bet information is transmitted to the CPU 92 of the main controller 90 and then is stored in a corresponding storage area of the RAM 94.

The CPU 631 increases credits of a player stored in the RAM 633 after receiving the credit signal from the data receiver 652.

The gaming board 640 includes a CPU 641, a boot ROM 642, and a ROM 643 that are interconnected by an internal bus. The gaming board 640 further includes a card slot 644s, a memory card 644 in the card slot 644s, an IC socket 645s, and a generic array logic (GAL) 645 in the IC socket 645s.

A card slot 644s is connected to the CPU 631 via an IDE bus.

The memory card 644 may store a game program and a game system program. The memory card 644 may include a nonvolatile memory such as CompactFlash (registered trademark) and may be removed from the card slot 644s. Therefore, types or contents of the game to be played at the player terminal 600 may be changed by rewriting the memory card 644 with another game program and game system program or by exchanging a memory card 644 storing with another game program and a game system program. Game programs may include a program or the like related to the progress of a game. The game programs include image data or sound data and the like to be outputted during the play of a game.

A GAL 64 is a kind of PLD having an OR-fixed arrayed structure. The GAL 64 has a plurality of input ports and output ports. When predetermined data is inputted to an input port, data corresponding to the predetermined data is outputted from an output port.

An IC socket 645s is configured to removably mount the GAL 64, and is connected to the CPU 631 through a PCI bus.

The CPU 641, the ROM 643, and the boot ROM 642 are connected to the CPU 631 by means of the PCI bus. The PCI bus transmits a signal between the CPU 631 and a gaming board 640 and then supplies power from the CPU 631 to the gaming board 640. The ROM 643 stores country identification information and an authentication program. The boot ROM 642 stores a preliminary authentication program and programs (boot codes) or the like for the CPU 641 to initiate the preliminary authentication program.

An authentication program is a program (tampering check program) for authenticating a game program and a game system program. The authentication program is described along authentication and certification that a game program and a game system program targeted for authentication acquisition processing are not tampered, i.e., procedures (authentication procedures) for authenticating the game program and the game system program. The preliminary authentication program is described along certification that an authentication program targeted for authentication processing is not tampered, i.e., procedures (authentication procedures) for authenticating authentication programs.

The images displayed on the terminal display 621 of the player terminal 600 according to an embodiment of the present invention is described in detail with reference to FIG. 46 to FIG. 48.

Figure 46:
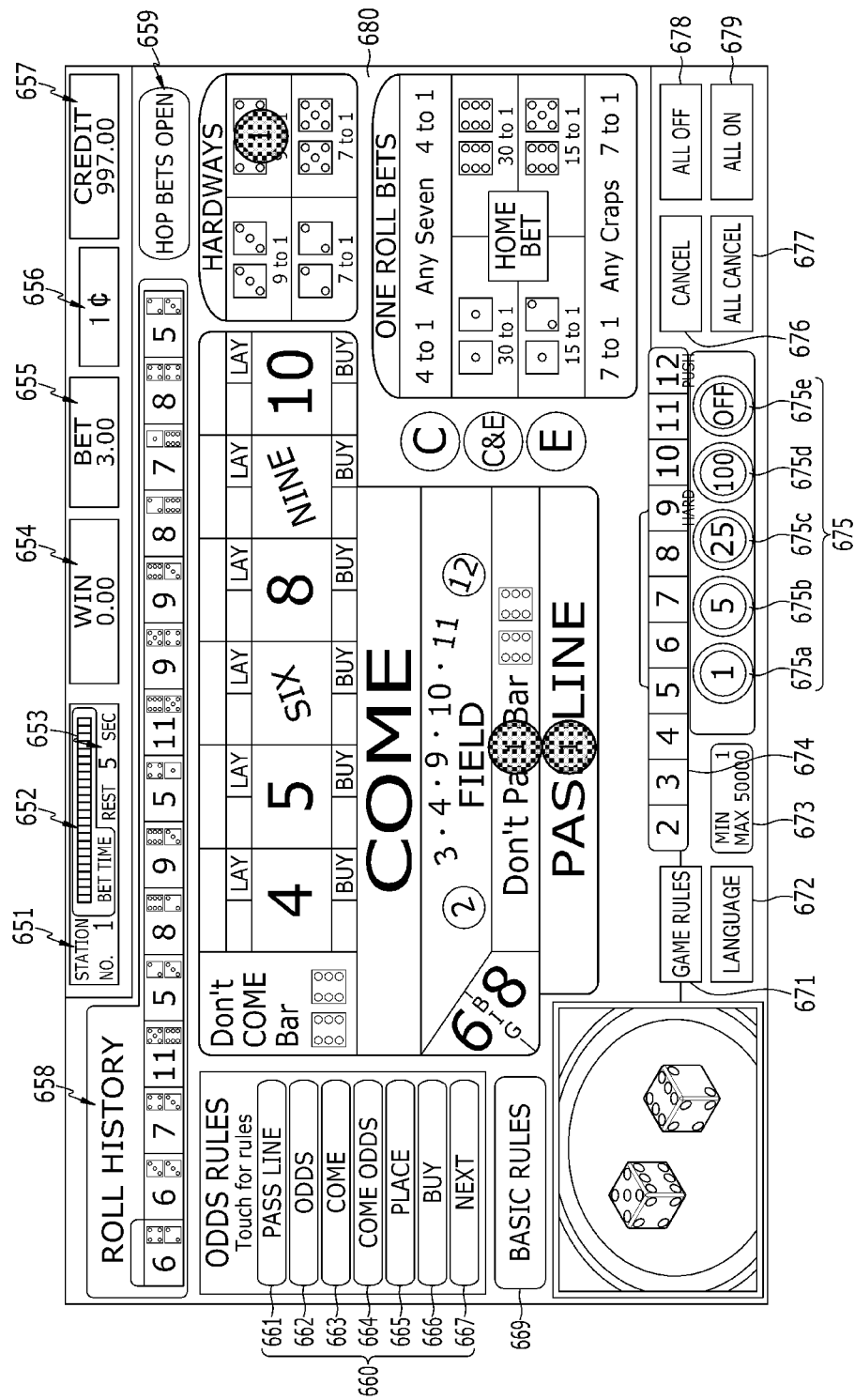
FIG. 46 to FIG. 48 are schematic screen shots of the terminal display for a game of craps according to one embodiment of the present invention.
Figure 47:
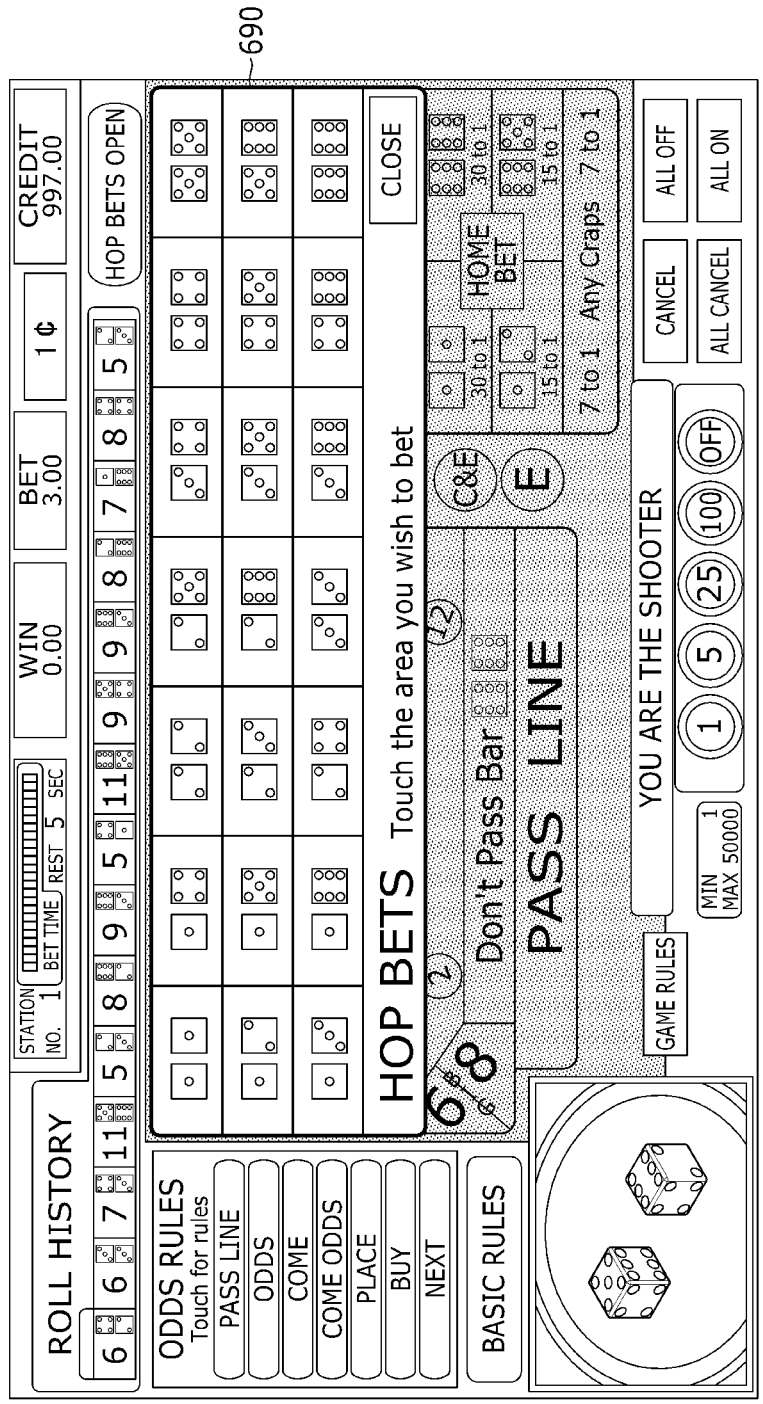
Figure 48:
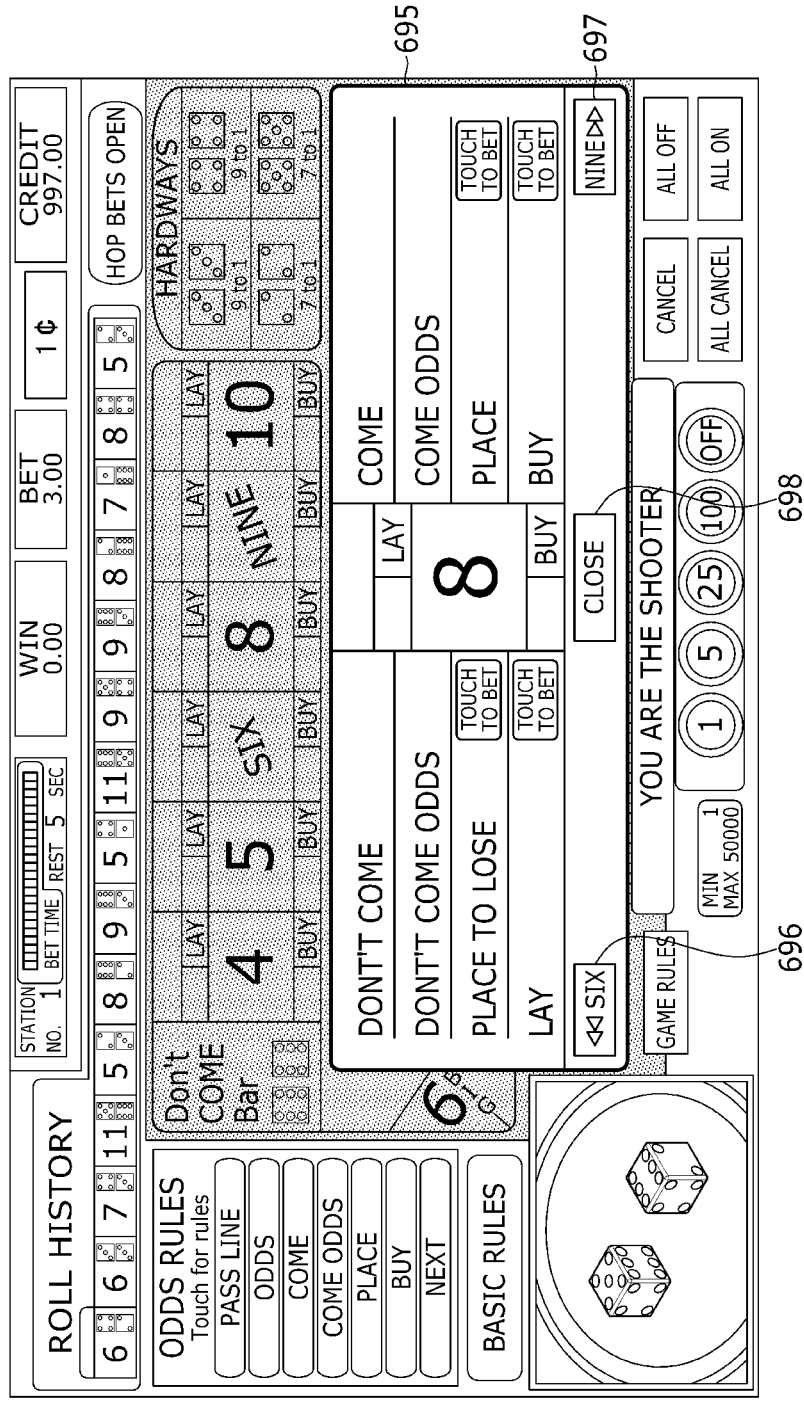

FIG. 46 to FIG. 48 are schematic screen shots of the terminal display for a game of craps according to one embodiment of the present invention.

As described above, a touch panel (625 in FIG. 45) is integrated onto the terminal display 621 of the player terminal 600 and disposed on the terminal display 621. When a player touches a touch area in the touch panel 625 on the terminal display 621, thereby enabling instruction input.

A screen for craps, for example, shows a betting board 680 including a plurality of touch-sensitive betting areas and other display areas in periphery of the betting board 680, for example, two rows of display areas disposed above the betting board 680, a column of display areas left to the betting board 680, and two rows of display areas disposed below the betting board 680.

An uppermost row of the screen shows a station number 651, a remaining bet time 652 and 653, a win meter 654, a bet meter 655, a denomination 656, and a credit meter 657 in sequence from left to right. The station number 651 denotes a unique identification number defined by the player terminal 600. The remaining bet time is shown as bars 652 and numerals 653. The win meter 654 shows credits won in a game round. The bet meter 655 shows the bet amount in the current game round by way of credits. The denomination 656 shows a current denomination. The credit meter 657 shows current credits of a player or a player terminal 600.

A second row shows a roll history 658 and a hop bet extension button 659 disposed right to the roll history 658. The roll history 658 includes results of past game rounds, which are listed in sequence, and each of the results includes a sum and rolled top surfaces of two dice, for example. According to an embodiment of the present invention, the roll history 658 may be touch-sensitive such that details of a game round, for example, including a betting area, a bet amount, a win prize are shown when a player touches an area showing a result of the game round. Referring to FIG. 47, the hop bet extension button 659, if touched, cause to pop up a betting board 690 for hop bet. The betting board 690 for hop bet will be described later.

A leftmost column disposed under the roll history 658 shows a bet type selection area 660 including a plurality of selection buttons 661-666 denoted by "PASS LINE," "ODDS," "COME," "COME ODDS," "PLACE," and "BUY," for example. When a player touches one of the selection buttons 661-666, a window showing information about the selected bet type may pop up over a betting board 500.

A game rules button 669 is disposed under of the bet type selection area 660. When a player touches the game rules button 669, the screen shows game rules.

A lowermost row shows a bet rule button 671 and an environment selection 672, a bet range 673, a winning rolled-number 674, bet buttons 675 (675a-675e), a cancel button 676 and an all-cancel button 677, an all-off button 678, and an all-on button 679 in sequence from the left to the right.

The bet rule button 671 is used in popping up a window showing information for description of each bet type in a craps game. The environment selection 672 shows two national flags partially overlap each other, and the environment is established for the country of the front flag. Whenever a player touches the environment selection 672, the national flags exchange their positions and the environment settings are changed.

The bet range 673 shows a minimum and a maximum of a bet range allowed in one game round. The winning rolled-number 674 shows sum of the rolled numbers of two dice for a player's win in the current bet.

The bet buttons 675a-675e are used in betting and denoted by "1," "5," "25," "100," and "OFF." For example, when a player touches one of the bet buttons 675a denoted by "1," one credit is set as a bet amount. When a player touches the bet button 675e denoted by "OFF," the bet amount is reset. The cancel button 676 is used in cancelling an immediately preceding bet, and the all-cancel button 677 is used in cancelling all cancelable bets.

The betting board 680 includes a plurality of betting areas. Betting areas denoted by "PASS LINE," "Don't Pass Bar," "FIELD," and "COME" are arranged in an upward direction, and a betting area denoted by "BIG" is disposed left to the betting areas "Don't Pass Bar" and "FIELD." Betting areas "Don't COME Bar," "4," "5," "SIX," "8," "NINE," and "10" are arranged in a row on the betting area "COME." At a right portion of the betting board 500, betting areas denoted by "C&E," "HARDWAYS," and "ONE ROLL BETS" are disposed. Referring to FIG. 48, betting areas "DON'T COME," "DON'T COME ODDS," "PLACE TO LOSE," "LAY," "COME," "COME ODDS," "PLACE," "BUY" are set at each of the betting areas "4," "5," "SIX," "8," "NINE," and "10."

A betting of a player may be conducted within a predetermined time duration (about 60 seconds, for example). For example, a player may select a betting area of the betting board 500 by touching the betting area with the finger or the like. Thereafter, the player may bet credits on the selected betting area by touching the bet buttons 675a-675d. However, the selection of the betting area may follow the betting operation.

FIG. 46 shows that a bet of one credit is placed on each of the betting areas "PASS LINE," "Don't Pass Bar," and "HARDWAYS." A word "HARD" is written under the number "8" of the winning rolled-number 674, and a word "PUSH" is shown under the number "12" of the winning rolled-number 674. The word "HARD" under "8" denotes that a player win when the same numbers of 4 face up in the two dice, and the word "PUSH" under "12" denotes that the result is a tie when the rolled numbers are 12. In other words, the winning rolled-number 674 may show the roll numbers and the betting area on which the player betted.

The betting of the player is finalized when the remaining bet time reaches 0.

The screen shown in FIG. 47 shows a hop betting board 690 for hop bet which pops up when a hop bet extension button 659 is touched. The hop betting board 690 shows betting areas corresponding to all of the combinations of rolled numbers of two dice. For example, total of 21 betting areas denoted by "1-1," "1-2," "1-3," "1-4," "1-5," "1-6," "2-2," "2-3," "2-4" "2-5," "2-6," "3-3," "3-4," "3-5," "3-6," "4-4," "4-5," "4-6," "5-5," "5-6," and "6-6" are shown in the hop betting board 690. Among the "HOP BET" betting areas, betting areas denoted by "2-2," "3-3," "4-4," and "5-5" have the same rolled numbers as those of "HARDWAYS." However, "HARDWAYS" is a bet type that a player wins when a hard way (same rolled numbers) occurs before an easy way (different rolled numbers), whereas "HOP BET" is a bet type that a player wins (one-roll bet) when a combination of rolled numbers of two dice in a roll executed right after betting is the same as a combination on which the player betted. Among the "HOP BET" betting areas, the betting areas denoted by "1-1," "1-2," "5-6," and "6-6" have the same rolled numbers as the betting areas of "Horn BET" in "ONE ROLL BETS," and the bet contents and payout are also similar. For example, the gaming machine 1 is configured to be able to bet on all of the combinations of rolled numbers of two dice as one-roll bets in a craps game. A craps game betting board and a betting board which is capable of betting on all of the combinations of rolled numbers of two dice are set separately.

FIG. 48 shows a screen when the betting area "8" is selected among the betting areas "4," "5," "SIX," "8," "NINE," and "10" shown in FIG. 46. Referring to FIG. 38, a window showing a betting board extension 695 pops up. An image of the number "8" is disposed at a center of the betting board extension 695, and a plurality of betting areas denoted by "DON'T COME," "DON'T COME ODDS," "PLACE TO LOSE," "LAY," "COME," "COME ODDS," "PLACE," and "BUY" are arranged at the left and right of the number image "8." Numeric value selection buttons 521 and 522 for moving to adjacent betting areas and a "CLOSE" button 523 are disposed in a lowermost row of the betting board extension 695.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A gaming machine comprising:
   a first display panel configured to display game images of a game, the first display panel including a screen facing downward;
   a plurality of first beam splitters disposed under the first display panel and inclined with respect to the screen to partially reflect the images from the first the display panel into a forward direction;
   a background image generator disposed rear to the first beam splitters and generating background images, the background images from the background image generator passing through the first beam splitters toward the forward direction to overlap the game images; and
   a controller configured to execute the game and to control the first display panel.

2. The gaming machine of claim 1, wherein background image generator comprises:
   a second display panel disposed under the first beam splitters and generating the background images; and
   a plurality of second beam splitters disposed rear to the first beam splitters and inclined reverse to the first beam splitters to partially reflect the background images from the second display panel into the forward direction.

3. The gaming machine of claim 2, wherein
   the first beam splitters form a regular pyramid, and
   the second beam splitters form a reversed pyramid disposed in the regular pyramid.

4. The gaming machine of claim 1, wherein the background image generator comprises:
   a projector disposed under the first beam splitters and generating the background images; and
   an image transmission member disposed rear to the first beam splitters, the image transmission member transmitting the background images from the projector into the forward direction.

5. The gaming machine of claim 4, wherein the image transmission member comprises a plurality of transparent plates inclined substantially parallel to the first beam splitters.

6. The gaming machine of claim 4, wherein the image transmission member comprises a plurality of second beam splitters inclined substantially parallel to the first beam splitters and partially transmitting the background images.

7. The gaming machine of claim 4, wherein the background image generator further comprises a screen member disposed on an outer surface of the image transmission member.

8. The gaming machine of claim 7, wherein the screen member includes a colored transparent or translucent sheet.

9. The gaming machine of claim 4, wherein the first beam splitters form a first pyramid, and the image transmission member forms a second pyramid disposed in the first pyramid.

10. The gaming machine of claim 1, wherein the background image generator comprises:
    a screen member disposed on a rear surface of the first beam splitters; and
    a projector disposed under the first beam splitters and generating the background images, the background images illuminated to the screen member.

11. The gaming machine of claim 10, wherein the screen member includes a colored transparent or translucent sheet.

12. The gaming machine of claim 11, wherein the first beam splitters form a pyramid.

13. The gaming machine of claim 1, further comprising a blocking member disposed in front of the display panel and extending downward from the display panel.

14. The gaming machine of claim 1, further comprising a filter disposed on the screen of the display panel,
    wherein the filter includes a translucent area facing a peripheral area of the screen and partially transmitting light from the display device with a transmittance that increases from an outer edge of the translucent area to an inner edge of the translucent area.

15. The gaming machine of claim 1, further comprising a plurality of player terminals connected to the controller.

16. The gaming machine of claim 15, wherein the plurality of player terminals are arranged such that at least two of the plurality of player terminals correspond to one of the first beam splitters.

17. The gaming machine of claim 15, wherein the game includes one of craps, sic bo, and roulette.

* * * * *